US010941525B2

(12) United States Patent
Sealey, II et al.

(10) Patent No.: US 10,941,525 B2
(45) **Date of Patent: *Mar. 9, 2021**

(54) SOFT, LOW LINT, THROUGH AIR DRIED TISSUE AND METHOD OF FORMING THE SAME

(71) Applicant: First Quality Tissue, LLC, Great Neck, NY (US)

(72) Inventors: James E. Sealey, II, Belton, SC (US); Byrd Tyler Miller, IV, Easley, SC (US)

(73) Assignee: First Quality Tissue, LLC, Great Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,028

(22) Filed: Oct. 10, 2019

(65) Prior Publication Data

US 2020/0040532 A1 Feb. 6, 2020

Related U.S. Application Data

(63) Continuation of application No. 16/378,790, filed on Apr. 9, 2019, which is a continuation of application No. 15/499,457, filed on Apr. 27, 2017, now Pat. No. 10,301,779.

(60) Provisional application No. 62/328,350, filed on Apr. 27, 2016.

(51) Int. Cl.

| | |
|---|---|
| ***D21H 17/37*** | (2006.01) |
| ***D21H 27/00*** | (2006.01) |
| ***D21F 5/18*** | (2006.01) |
| ***B32B 7/12*** | (2006.01) |
| ***D21F 11/14*** | (2006.01) |
| ***D21H 11/04*** | (2006.01) |
| ***D21H 17/28*** | (2006.01) |
| ***D21H 21/14*** | (2006.01) |
| ***D21H 21/18*** | (2006.01) |
| ***D21H 21/20*** | (2006.01) |
| ***D21H 21/24*** | (2006.01) |
| ***D21H 27/32*** | (2006.01) |
| ***D21H 27/38*** | (2006.01) |
| ***D21H 27/40*** | (2006.01) |
| ***B32B 29/00*** | (2006.01) |
| ***D21F 13/00*** | (2006.01) |
| ***D21H 17/02*** | (2006.01) |
| ***D21H 27/30*** | (2006.01) |

(52) U.S. Cl.

CPC ............. *D21H 27/005* (2013.01); *B32B 7/12* (2013.01); *B32B 29/002* (2013.01); *D21F 5/181* (2013.01); *D21F 11/145* (2013.01); *D21F 13/00* (2013.01); *D21H 11/04* (2013.01); *D21H 17/02* (2013.01); *D21H 17/28* (2013.01); *D21H 17/37* (2013.01); *D21H 17/375* (2013.01); *D21H 21/14* (2013.01); *D21H 21/18* (2013.01); *D21H 21/20* (2013.01); *D21H 21/24* (2013.01); *D21H 27/002* (2013.01); *D21H 27/30* (2013.01); *D21H 27/32* (2013.01); *D21H 27/38* (2013.01); *D21H 27/40* (2013.01); *B32B 2250/03* (2013.01); *B32B 2250/26* (2013.01); *B32B 2262/02* (2013.01); *B32B 2262/062* (2013.01); *B32B 2262/067* (2013.01); *B32B 2307/54* (2013.01); *B32B 2307/546* (2013.01); *B32B 2307/718* (2013.01); *B32B 2309/105* (2013.01); *B32B 2555/02* (2013.01)

(58) Field of Classification Search

USPC .......................................................... 162/123

See application file for complete search history.

(56) References Cited

U.S. PATENT DOCUMENTS

| | | | |
|---|---|---|---|
| 2,919,467 | A | 1/1960 | Mercer |
| 2,926,154 | A | 2/1960 | Keim |
| 3,026,231 | A | 3/1962 | Chavannes |
| 3,049,469 | A | 8/1962 | Davison |
| 3,058,873 | A | 10/1962 | Keim et al. |
| 3,066,066 | A | 11/1962 | Keim et al. |
| 3,097,994 | A | 7/1963 | Dickens et al. |
| 3,125,552 | A | 3/1964 | Loshaek et al. |
| 3,143,150 | A | 8/1964 | Buchanan |
| 3,186,900 | A | 6/1965 | De Young |
| 3,197,427 | A | 7/1965 | Schmalz |

(Continued)

FOREIGN PATENT DOCUMENTS

| | | | |
|---|---|---|---|
| CA | 2168894 | A1 | 8/1997 |
| CA | 2795139 | A1 | 10/2011 |

(Continued)

OTHER PUBLICATIONS

Supplementary European Search report dated Apr. 30, 2020 in connection with European Patent Application No. 17790445.5.

(Continued)

*Primary Examiner* — Mark Halpern

(74) *Attorney, Agent, or Firm* — Amster, Rothstein & Ebenstein LLP

(57) ABSTRACT

A multi-ply through air dried structured tissue having a bulk softness of less than 10 TS7 and a lint value of 5.0 or less. Each ply of the tissue has a first exterior layer that includes a wet end temporary wet strength additive in an amount of approximately 0.25 kg/ton and a wet end dry strength additive in an amount of approximately 0.25 kg/ton, an interior layer that includes a first wet end additive comprising an ionic surfactant, and a second wet end additive comprising a non-ionic surfactant, and a second exterior layer.

29 Claims, 6 Drawing Sheets

(56) References Cited

U.S. PATENT DOCUMENTS 3,224,986 A 12/1965 Butler et al.
3,224,990 A 12/1965 Babcock
3,227,615 A 1/1966 Korden
3,227,671 A 1/1966 Keim
3,239,491 A 3/1966 Tsou et al.
3,240,664 A 3/1966 Earle, Jr.
3,240,761 A 3/1966 Keim et al.
3,248,280 A 4/1966 Hyland, Jr.
3,250,664 A 5/1966 Conte et al.
3,252,181 A 5/1966 Hureau
3,301,746 A 1/1967 Sanford et al.
3,311,594 A 3/1967 Earle, Jr.
3,329,657 A 7/1967 Strazdins et al.
3,332,834 A 7/1967 Reynolds, Jr.
3,332,901 A 7/1967 Keim
3,352,833 A 11/1967 Earle, Jr.
3,384,692 A 5/1968 Galt et al.
3,414,459 A 12/1968 Wells
3,442,754 A 5/1969 Espy
3,459,697 A 8/1969 Goldberg et al.
3,473,576 A 10/1969 Amneus
3,483,077 A 12/1969 Aldrich
3,545,165 A 12/1970 Greenwell
3,556,932 A 1/1971 Coscia et al.
3,573,164 A 3/1971 Friedberg et al.
3,609,126 A 9/1971 Asao et al.
3,666,609 A 5/1972 Kalwaites et al.
3,672,949 A 6/1972 Brown
3,672,950 A 6/1972 Murphy et al.
3,773,290 A 11/1973 Mowery
3,778,339 A 12/1973 Williams et al.
3,813,362 A 5/1974 Coscia et al.
3,855,158 A 12/1974 Petrovich et al.
3,877,510 A 4/1975 Tegtmeier et al.
3,905,863 A 9/1975 Ayers
3,911,173 A 10/1975 Sprague, Jr.
3,974,025 A 8/1976 Ayers
3,994,771 A 11/1976 Morgan, Jr. et al.
3,998,690 A 12/1976 Lyness et al.
4,038,008 A 7/1977 Larsen
4,075,382 A 2/1978 Chapman et al.
4,088,528 A 5/1978 Berger et al.
4,098,632 A 7/1978 Sprague, Jr.
4,102,737 A 7/1978 Morton
4,129,528 A 12/1978 Petrovich et al.
4,147,586 A 4/1979 Petrovich et al.
4,184,519 A 1/1980 McDonald et al.
4,190,692 A 2/1980 Larsen
4,191,609 A 3/1980 Trokhan
4,252,761 A 2/1981 Schoggen et al.
4,320,162 A 3/1982 Schulz
4,331,510 A 5/1982 Wells
4,382,987 A 5/1983 Smart
4,440,597 A 4/1984 Wells et al.
4,501,862 A 2/1985 Keim
4,507,351 A 3/1985 Johnson et al.
4,514,345 A 4/1985 Johnson et al.
4,515,657 A 5/1985 Maslanka
4,528,239 A 7/1985 Trokhan
4,529,480 A 7/1985 Trokhan
4,537,657 A 8/1985 Keim
4,545,857 A 10/1985 Wells
4,637,859 A 1/1987 Trokhan
4,678,590 A 7/1987 Nakamura et al.
4,714,736 A 12/1987 Juhl et al.
4,770,920 A 9/1988 Larsonneur
4,780,357 A 10/1988 Akao
4,808,467 A 2/1989 Suskind et al.
4,836,894 A 6/1989 Chance et al.
4,849,054 A 7/1989 Klowak
4,885,202 A 12/1989 Lloyd et al.
4,891,249 A 1/1990 McIntyre
4,909,284 A 3/1990 Kositake
4,949,668 A 8/1990 Heindel et al.
4,949,688 A 8/1990 Bayless
4,983,256 A 1/1991 Combette et al.
4,996,091 A 2/1991 McIntyre
5,059,282 A 10/1991 Ampulski et al.
5,143,776 A 9/1992 Givens
5,149,401 A 9/1992 Langevin et al.
5,152,874 A 10/1992 Keller
5,211,813 A 5/1993 Sawley et al.
5,239,047 A 8/1993 Devore et al.
5,279,098 A 1/1994 Fukuda
5,281,306 A 1/1994 Kakiuchi et al.
5,334,289 A 8/1994 Trokhan et al.
5,347,795 A 9/1994 Fukuda
5,397,435 A 3/1995 Ostendorf et al.
5,399,412 A 3/1995 Sudall et al.
5,405,501 A 4/1995 Phan et al.
5,409,572 A 4/1995 Kershaw et al.
5,429,686 A 7/1995 Chiu et al.
5,439,559 A 8/1995 Crouse
5,447,012 A 9/1995 Kovacs et al.
5,470,436 A 11/1995 Wagle et al.
5,487,313 A 1/1996 Johnson
5,509,913 A 4/1996 Yeo
5,510,002 A 4/1996 Hermans et al.
5,529,665 A 6/1996 Kaun
5,581,906 A 12/1996 Ensign et al.
5,591,147 A 1/1997 Couture-Dorschner et al.
5,607,551 A 3/1997 Farrington, Jr. et al.
5,611,890 A 3/1997 Vinson et al.
5,628,876 A 5/1997 Ayers et al.
5,635,028 A 6/1997 Vinson et al.
5,649,916 A 7/1997 DiPalma et al.
5,671,897 A 9/1997 Ogg et al.
5,672,248 A 9/1997 Wendt et al.
5,679,222 A 10/1997 Rasch et al.
5,685,428 A 11/1997 Herbers et al.
5,728,268 A 3/1998 Weisman et al.
5,746,887 A 5/1998 Wendt et al.
5,753,067 A 5/1998 Fukuda et al.
5,772,845 A 6/1998 Farrington, Jr. et al.
5,806,569 A 9/1998 Gulya et al.
5,827,384 A 10/1998 Canfield et al.
5,832,962 A 11/1998 Kaufman et al.
5,846,380 A 12/1998 Van Phan et al.
5,855,738 A 1/1999 Weisman et al.
5,858,554 A 1/1999 Neal et al.
5,865,396 A 2/1999 Ogg et al.
5,865,950 A 2/1999 Vinson et al.
5,893,965 A 4/1999 Trokhan et al.
5,913,765 A 6/1999 Burgess et al.
5,942,085 A 8/1999 Neal et al.
5,944,954 A 8/1999 Vinson et al.
5,948,210 A 9/1999 Huston
5,980,691 A 11/1999 Weisman et al.
6,036,139 A 3/2000 Ogg
6,039,838 A 3/2000 Kaufman et al.
6,048,938 A 4/2000 Neal et al.
6,060,149 A 5/2000 Nissing et al.
6,106,670 A 8/2000 Weisman et al.
6,149,769 A 11/2000 Mohammadi et al.
6,162,327 A 12/2000 Batra et al.
6,162,329 A 12/2000 Vinson et al.
6,187,138 B1 2/2001 Neal et al.
6,200,419 B1 3/2001 Phan
6,203,667 B1 3/2001 Huhtelin
6,207,734 B1 3/2001 Vinson et al.
6,231,723 B1 5/2001 Kanitz et al.
6,287,426 B1 9/2001 Edwards et al.
6,303,233 B1 10/2001 Amon et al.
6,319,362 B1 11/2001 Huhtelin et al.
6,344,111 B1 2/2002 Wilhelm
6,420,013 B1 7/2002 Vinson et al.
6,420,100 B1 7/2002 Trokhan et al.
6,423,184 B2 7/2002 Vahatalo et al.
6,458,246 B1 10/2002 Kanitz et al.
6,464,831 B1 10/2002 Trokhan et al.
6,473,670 B1 10/2002 Huhtelin
6,521,089 B1 2/2003 Griech et al.
6,537,407 B1 3/2003 Law et al.
6,547,928 B2 4/2003 Barnholtz et al.

(56) References Cited

U.S. PATENT DOCUMENTS 6,551,453 B2 4/2003 Weisman et al.
6,551,691 B1 4/2003 Hoeft et al.
6,572,722 B1 6/2003 Pratt
6,579,416 B1 6/2003 Vinson et al.
6,602,454 B2 8/2003 McGuire et al.
6,607,637 B1 8/2003 Vinson et al.
6,610,173 B1 8/2003 Lindsay et al.
6,613,194 B2 9/2003 Kanitz et al.
6,660,362 B1 9/2003 Lindsay et al.
6,673,202 B2 1/2004 Burazin
6,701,637 B2 3/2004 Lindsay et al.
6,755,939 B2 6/2004 Vinson et al.
6,773,647 B2 8/2004 McGuire et al.
6,797,117 B1 9/2004 McKay et al.
6,808,599 B2 10/2004 Burazin
6,821,386 B2 11/2004 Weisman et al.
6,821,391 B2 11/2004 Scherb et al.
6,827,818 B2 12/2004 Farrington, Jr. et al.
6,863,777 B2 3/2005 Kanitz et al.
6,896,767 B2 5/2005 Wilhelm
6,939,443 B2 9/2005 Ryan et al.
6,998,017 B2 2/2006 Lindsay et al.
6,998,024 B2 2/2006 Burazin
7,005,043 B2 2/2006 Toney et al.
7,014,735 B2 3/2006 Kramer et al.
7,105,465 B2 9/2006 Patel et al.
7,155,876 B2 1/2007 VanderTuin et al.
7,157,389 B2 1/2007 Branham et al.
7,182,837 B2 2/2007 Chen et al.
7,194,788 B2 3/2007 Clark et al.
7,235,156 B2 6/2007 Baggot
7,269,929 B2 9/2007 VanderTuin et al.
7,294,230 B2 11/2007 Flugge-Berendes et al.
7,311,853 B2 12/2007 Vinson et al.
7,328,550 B2 2/2008 Floding et al.
7,339,378 B2 3/2008 Han et al.
7,351,307 B2 4/2008 Scherb et al.
7,387,706 B2 6/2008 Herman et al.
7,399,378 B2 7/2008 Edwards et al.
7,419,569 B2 9/2008 Hermans
7,427,434 B2 9/2008 Busam
7,431,801 B2 10/2008 Conn et al.
7,432,309 B2 10/2008 Vinson
7,442,278 B2 10/2008 Murray et al.
7,452,447 B2 11/2008 Duan et al.
7,476,293 B2 1/2009 Herman et al.
7,494,563 B2 2/2009 Edwards et al.
7,510,631 B2 3/2009 Scherb et al.
7,513,975 B2 4/2009 Burma
7,563,344 B2 7/2009 Beuther
7,582,187 B2 9/2009 Scherb et al.
7,611,607 B2 11/2009 Mullally et al.
7,622,020 B2 11/2009 Awofeso
7,662,462 B2 2/2010 Noda
7,670,678 B2 3/2010 Phan
7,683,126 B2 3/2010 Neal et al.
7,686,923 B2 3/2010 Scherb et al.
7,687,140 B2 3/2010 Manifold et al.
7,691,230 B2 4/2010 Scherb et al.
7,731,819 B2 * 6/2010 Awofeso ................ D21H 15/02 162/111
7,744,722 B1 6/2010 Tucker et al.
7,744,726 B2 6/2010 Scherb et al.
7,799,382 B2 9/2010 Payne et al.
7,811,418 B2 10/2010 Klerelid et al.
7,815,978 B2 10/2010 Davenport et al.
7,823,366 B2 11/2010 Schoeneck
7,842,163 B2 11/2010 Nickel et al.
7,867,361 B2 1/2011 Salaam et al.
7,871,692 B2 1/2011 Morin et al.
7,887,673 B2 2/2011 Andersson et al.
7,905,989 B2 3/2011 Scherb et al.
7,914,866 B2 3/2011 Shannon et al.
7,931,781 B2 4/2011 Scherb et al.
7,951,269 B2 5/2011 Herman et al.
7,955,549 B2 6/2011 Noda
7,959,764 B2 6/2011 Ringer et al.
7,972,475 B2 7/2011 Chan et al.
7,989,058 B2 8/2011 Manifold et al.
8,034,463 B2 10/2011 Leimbach et al.
8,051,629 B2 11/2011 Pazdernik et al.
8,075,739 B2 12/2011 Scherb et al.
8,092,652 B2 1/2012 Scherb et al.
8,118,979 B2 2/2012 Herman et al.
8,147,649 B1 4/2012 Tucker et al.
8,152,959 B2 4/2012 Elony et al.
8,196,314 B2 6/2012 Munch
8,216,427 B2 7/2012 Klerelid et al.
8,236,135 B2 8/2012 Prodoehl et al.
8,303,773 B2 11/2012 Scherb et al.
8,382,956 B2 2/2013 Boechat et al.
8,402,673 B2 3/2013 Da Silva et al.
8,409,404 B2 4/2013 Harper et al.
8,435,384 B2 5/2013 Da Silva et al.
8,440,055 B2 5/2013 Scherb et al.
8,445,032 B2 5/2013 Topolkaraev et al.
8,454,800 B2 6/2013 Mourad et al.
8,470,133 B2 6/2013 Cunnane et al.
8,506,756 B2 8/2013 Denis et al.
8,544,184 B2 10/2013 Da Silva et al.
8,574,211 B2 11/2013 Morita
8,580,083 B2 11/2013 Boechat et al.
8,728,277 B2 5/2014 Boechat et al.
8,758,569 B2 6/2014 Aberg et al.
8,771,466 B2 7/2014 Denis et al.
8,801,903 B2 8/2014 Mourad et al.
8,815,057 B2 8/2014 Eberhardt et al.
8,822,009 B2 9/2014 Riviere et al.
8,968,517 B2 3/2015 Ramaratnam et al.
8,980,062 B2 3/2015 Karlsson et al.
9,005,710 B2 4/2015 Jones et al.
D734,617 S 7/2015 Seitzinger et al.
9,095,477 B2 8/2015 Yamaguchi
D738,633 S 9/2015 Seitzinger et al.
9,382,666 B2 7/2016 Ramaratnam et al.
9,506,203 B2 11/2016 Ramaratnam et al.
9,580,872 B2 2/2017 Ramaratnam et al.
9,702,089 B2 7/2017 Ramaratnam et al.
9,702,090 B2 7/2017 Ramaratnam et al.
9,719,213 B2 8/2017 Miller, IV et al.
9,725,853 B2 8/2017 Ramaratnam et al.
2001/0018068 A1 8/2001 Lorenzi et al.
2002/0028230 A1 3/2002 Eichhorn et al.
2002/0060049 A1 5/2002 Kanitz et al.
2002/0061386 A1 5/2002 Carson et al.
2002/0098317 A1 7/2002 Jaschinski et al.
2002/0110655 A1 8/2002 Seth
2002/0115194 A1 8/2002 Lange et al.
2002/0125606 A1 9/2002 McGuire et al.
2003/0024674 A1 2/2003 Kanitz et al.
2003/0056911 A1 3/2003 Hermans et al.
2003/0056917 A1 3/2003 Jimenez
2003/0070781 A1 4/2003 Hermans et al.
2003/0114071 A1 6/2003 Everhart et al.
2003/0159401 A1 8/2003 Sorensson et al.
2003/0188843 A1 10/2003 Kanitz et al.
2003/0218274 A1 11/2003 Boutilier et al.
2004/0118531 A1 6/2004 Shannon et al.
2004/0123963 A1 7/2004 Chen et al.
2004/0126601 A1 7/2004 Kramer et al.
2004/0126710 A1 7/2004 Hill et al.
2004/0168784 A1 9/2004 Duan et al.
2004/0173333 A1 9/2004 Hermans et al.
2004/0234804 A1 11/2004 Liu et al.
2005/0016704 A1 1/2005 Huhtelin
2005/0069679 A1 3/2005 Stelljes et al.
2005/0069680 A1 3/2005 Stelljes et al.
2005/0098281 A1 5/2005 Schulz et al.
2005/0112115 A1 5/2005 Khan
2005/0123726 A1 6/2005 Broering et al.
2005/0130536 A1 6/2005 Siebers et al.
2005/0136222 A1 6/2005 Hada et al.
2005/0148257 A1 7/2005 Hermans et al.
2005/0150626 A1 7/2005 Kanitz et al.

(56) References Cited

U.S. PATENT DOCUMENTS

| | | | |
|---|---|---|---|
| 2005/0166551 | A1 | 8/2005 | Keane et al. |
| 2005/0241786 | A1 | 11/2005 | Edwards et al. |
| 2005/0241788 | A1 | 11/2005 | Baggot et al. |
| 2005/0252626 | A1 | 11/2005 | Chen et al. |
| 2005/0280184 | A1 | 12/2005 | Sayers et al. |
| 2005/0287340 | A1 | 12/2005 | Morelli et al. |
| 2006/0005916 | A1 | 1/2006 | Stelljes et al. |
| 2006/0013998 | A1 | 1/2006 | Stelljes et al. |
| 2006/0019567 | A1 | 1/2006 | Sayers |
| 2006/0083899 | A1 | 4/2006 | Burazin et al. |
| 2006/0093788 | A1 | 5/2006 | Behm et al. |
| 2006/0113049 | A1 | 6/2006 | Knobloch et al. |
| 2006/0130986 | A1 | 6/2006 | Flugge-Berendes et al. |
| 2006/0194022 | A1 | 8/2006 | Boutilier et al. |
| 2006/0269706 | A1 | 11/2006 | Shannon et al. |
| 2007/0020315 | A1 | 1/2007 | Shannon et al. |
| 2007/0131366 | A1 | 6/2007 | Underhill et al. |
| 2007/0137813 | A1 | 6/2007 | Nickel et al. |
| 2007/0137814 | A1 | 6/2007 | Gao |
| 2007/0170610 | A1 | 7/2007 | Payne et al. |
| 2007/0240842 | A1 | 10/2007 | Scherb et al. |
| 2007/0251659 | A1 | 11/2007 | Fernandes et al. |
| 2007/0251660 | A1 | 11/2007 | Walkenhaus et al. |
| 2007/0267157 | A1 | 11/2007 | Kanitz et al. |
| 2007/0272381 | A1 | 11/2007 | Elony et al. |
| 2007/0275866 | A1 | 11/2007 | Dykstra |
| 2007/0298221 | A1 | 12/2007 | Vinson |
| 2008/0035289 | A1 | 2/2008 | Edwards et al. |
| 2008/0076695 | A1 | 3/2008 | Uitenbroek et al. |
| 2008/0156450 | A1 | 7/2008 | Klerelid et al. |
| 2008/0199655 | A1 | 8/2008 | Monnerie et al. |
| 2008/0245498 | A1 | 10/2008 | Ostendorf et al. |
| 2008/0302493 | A1 | 12/2008 | Boatman et al. |
| 2008/0308247 | A1 | 12/2008 | Ringer et al. |
| 2009/0020248 | A1 | 1/2009 | Sumnicht et al. |
| 2009/0056892 | A1 | 3/2009 | Rekoske |
| 2009/0061709 | A1 | 3/2009 | Nakai et al. |
| 2009/0205797 | A1 | 8/2009 | Fernandes et al. |
| 2009/0218056 | A1 | 9/2009 | Manifold et al. |
| 2010/0065234 | A1 | 3/2010 | Klerelid et al. |
| 2010/0119779 | A1 | 5/2010 | Ostendorf et al. |
| 2010/0224338 | A1 | 9/2010 | Harper et al. |
| 2010/0230064 | A1 | 9/2010 | Eagles et al. |
| 2010/0236034 | A1 | 9/2010 | Eagles et al. |
| 2010/0239825 | A1 | 9/2010 | Sheehan et al. |
| 2010/0272965 | A1 | 10/2010 | Schinkoreit et al. |
| 2011/0027545 | A1 | 2/2011 | Harlacher et al. |
| 2011/0180223 | A1 | 7/2011 | Klerelid et al. |
| 2011/0189435 | A1 | 8/2011 | Manifold et al. |
| 2011/0189442 | A1 | 8/2011 | Manifold et al. |
| 2011/0206913 | A1 | 8/2011 | Manifold et al. |
| 2011/0223381 | A1 | 9/2011 | Sauter et al. |
| 2011/0253329 | A1 | 10/2011 | Manifold et al. |
| 2011/0265967 | A1 | 11/2011 | Van Phan |
| 2011/0303379 | A1 | 12/2011 | Boechat et al. |
| 2012/0144611 | A1 | 6/2012 | Baker et al. |
| 2012/0152475 | A1 | 6/2012 | Edwards et al. |
| 2012/0177888 | A1 | 7/2012 | Escafere et al. |
| 2012/0244241 | A1 | 9/2012 | McNeil |
| 2012/0267063 | A1 | 10/2012 | Klerelid et al. |
| 2012/0297560 | A1 | 11/2012 | Zwick et al. |
| 2013/0008135 | A1 | 1/2013 | Moore et al. |
| 2013/0029105 | A1 | 1/2013 | Miller et al. |
| 2013/0029106 | A1 | 1/2013 | Lee et al. |
| 2013/0133851 | A1 | 5/2013 | Boechat et al. |
| 2013/0150817 | A1 | 6/2013 | Kainth et al. |
| 2013/0160960 | A1 | 6/2013 | Hermans et al. |
| 2013/0209749 | A1 | 8/2013 | Myangiro et al. |
| 2013/0248129 | A1 | 9/2013 | Manifold et al. |
| 2013/0327487 | A1 | 12/2013 | Espinosa et al. |
| 2014/0004307 | A1 | 1/2014 | Sheehan |
| 2014/0041820 | A1 | 2/2014 | Ramaratnam et al. |
| 2014/0041822 | A1 | 2/2014 | Boechat et al. |
| 2014/0050890 | A1 | 2/2014 | Zwick et al. |
| 2014/0053994 | A1 | 2/2014 | Manifold et al. |
| 2014/0096924 | A1 | 4/2014 | Rekokske et al. |
| 2014/0182798 | A1 | 7/2014 | Polat et al. |
| 2014/0242320 | A1 | 8/2014 | McNeil et al. |
| 2014/0272269 | A1 | 9/2014 | Hansen |
| 2014/0272747 | A1 | 9/2014 | Ciurkot |
| 2014/0284237 | A1 | 9/2014 | Gosset |
| 2014/0360519 | A1 | 12/2014 | George et al. |
| 2015/0059995 | A1 | 3/2015 | Ramaratnam et al. |
| 2015/0102526 | A1 | 4/2015 | Ward et al. |
| 2015/0129145 | A1 | 5/2015 | Chou et al. |
| 2015/0211179 | A1 | 7/2015 | Alias et al. |
| 2015/0241788 | A1 | 8/2015 | Yamaguchi |
| 2015/0330029 | A1 | 11/2015 | Ramaratnam et al. |
| 2016/0060811 | A1 | 3/2016 | Riding et al. |
| 2016/0090692 | A1 | 3/2016 | Eagles et al. |
| 2016/0090693 | A1 | 3/2016 | Eagles et al. |
| 2016/0130762 | A1 | 5/2016 | Ramaratnam et al. |
| 2016/0145810 | A1 | 5/2016 | Miller, IV et al. |
| 2016/0159007 | A1 | 6/2016 | Miller, IV et al. |
| 2016/0160448 | A1 | 6/2016 | Miller, IV et al. |
| 2016/0185041 | A1 | 6/2016 | Topolkaraev et al. |
| 2016/0185050 | A1 | 6/2016 | Topolkaraev et al. |
| 2016/0273168 | A1 | 9/2016 | Ramaratnam et al. |
| 2016/0273169 | A1 | 9/2016 | Ramaratnam et al. |
| 2016/0289897 | A1 | 10/2016 | Ramaratnam et al. |
| 2016/0289898 | A1 | 10/2016 | Ramaratnam et al. |
| 2017/0044717 | A1 | 2/2017 | Quigley |
| 2017/0101741 | A1 | 4/2017 | Sealey et al. |
| 2017/0167082 | A1 | 6/2017 | Ramaratnam et al. |
| 2017/0226698 | A1 | 8/2017 | LeBrun et al. |
| 2017/0233946 | A1 | 8/2017 | Sealey et al. |
| 2017/0253422 | A1 | 9/2017 | Anklam et al. |
| 2017/0268178 | A1 | 9/2017 | Ramaratnam et al. |

FOREIGN PATENT DOCUMENTS

| | | | |
|---|---|---|---|
| CN | 1138356 | A | 12/1996 |
| CN | 1207149 | A | 2/1999 |
| CN | 1244899 | A | 2/2000 |
| CN | 1268559 | A | 10/2000 |
| CN | 1377405 | A | 10/2002 |
| CN | 2728254 | Y | 9/2005 |
| DE | 4242539 | A1 | 8/1993 |
| EP | 0097036 | A2 | 12/1983 |
| EP | 0979895 | A1 | 2/2000 |
| EP | 1911574 | A1 | 1/2007 |
| EP | 1339915 | B1 | 7/2007 |
| EP | 2123826 | A2 | 5/2009 |
| GB | 946093 | A | 1/1964 |
| JP | 2013208298 | A | 10/2013 |
| JP | 2014213138 | A | 11/2014 |
| WO | 95/01478 | A1 | 1/1995 |
| WO | 96/06223 | A1 | 2/1996 |
| WO | 200382550 | A2 | 10/2003 |
| WO | 200445834 | A1 | 6/2004 |
| WO | 2007070145 | A1 | 6/2007 |
| WO | 2007112916 | A1 | 10/2007 |
| WO | 2008019702 | A1 | 2/2008 |
| WO | 2009006709 | A1 | 1/2009 |
| WO | 2009/061079 | A1 | 5/2009 |
| WO | 2009067079 | A1 | 5/2009 |
| WO | 2011028823 | A1 | 3/2011 |
| WO | 2012003360 | A2 | 1/2012 |
| WO | 2013024297 | A1 | 2/2013 |
| WO | 2013136471 | A1 | 9/2013 |
| WO | 2014/022848 | A1 | 2/2014 |
| WO | 2014022848 | A1 | 2/2014 |
| WO | 201500755 | A1 | 1/2015 |
| WO | 2015/176063 | A1 | 11/2015 |
| WO | 2015176063 | A1 | 11/2015 |
| WO | 2016/077594 | A1 | 5/2016 |
| WO | 2016/086019 | A1 | 6/2016 |
| WO | 2016/090242 | A1 | 6/2016 |
| WO | 2016/090364 | A1 | 6/2016 |
| WO | 2016085704 | A1 | 6/2016 |
| WO | 2017066465 | A1 | 4/2017 |

(56) References Cited

FOREIGN PATENT DOCUMENTS

| | | |
|---|---|---|
| WO | 2017066656 A1 | 4/2017 |
| WO | 2017139786 A1 | 8/2017 |

OTHER PUBLICATIONS

International Search Report for PCT/US16/56871 dated Jan. 12, 2017.
Written Opinion of International Searching Authority for PCT/US16/56871 dated Jan. 12, 2017.
International Search Report for PCT/US2016/057163 dated Dec. 23, 2016.
Written Opinion of International Searching Authority for PCT/US2016/057163 dated Dec. 23, 2016.
International Search Report for PCT/US2017/029890 dated Jul. 14, 2017.
Written Opinion of International Searching Authority for PCT/US2017/029890 dated Jul. 14, 2017.
International Search Report for PCT/US2017/032746 dated Aug. 7, 2017.
Written Opinion of International Searching Authority for PCT/US2017/032746 dated Aug. 7, 2017.
International Search Report for PCT/US17/17705 dated Jun. 9, 2017.
Written Opinion of International Searching Authority for PCT/US17/17705 dated Jun. 9, 2017.
Written Opinion of International Search Authority for PCT/US15/62483 dated May 6, 2016.
International Search Report for PCT/US15/63986 dated Mar. 29, 2016.
Written Opinion of International Searching Authority for PCT/US15/63986 dated Mar. 29, 2016.
International Search Report for PCT/US15/64284 dated Feb. 11, 2016.
Written Opinion of International Searching Authority for PCT/US15/64284 dated Feb. 11, 2016.
International Search Report for PCT/US13/53593 dated Dec. 30, 2013.
Written Opinion of International Searching Authority for PCT/US13/53593 dated Dec. 30, 2013.
International Search Report for PCT/US15/31411 dated Aug. 13, 2015.
Written Opinion of International Searching Authority for PCT/US15/31411 dated Aug. 13, 2015.
International Search Report for PCT/US15/60398 dated Jan. 29, 2016.
Written Opinion of International Searching Authority for PCT/US15/60398 dated Jan. 29, 2016.
International Search Report for PCT/US15/62483 dated May 6, 2016.
International Preliminary Report on Patentability of PCT/US2013/053593 dated Feb. 3, 2015.
Supplementary European Search Report of EP 13 82 6461 dated Apr. 1, 2016.

* cited by examiner

SOFT, LOW LINT, THROUGH AIR DRIED TISSUE AND METHOD OF FORMING THE SAME

RELATED APPLICATION

This application is a continuation of U.S. patent application Ser. No. 16/378,790, filed Apr. 9, 2019 and entitled SOFT, LOW LINT, THROUGH AIR DRIED TISSUE AND METHOD OF FORMING THE SAME, which in turn is a continuation of U.S. patent application Ser. No. 15/499,457, filed Apr. 27, 2017 and entitled SOFT, LOW LINT, THROUGH AIR DRIED TISSUE AND METHOD OF FORMING THE SAME, now U.S. Pat. No. 10,301,779, which in turn claims priority under 35 U.S.C. § 119(e) to U.S. Provisional Patent Application Ser. No. 62/328,350, entitled Soft, Low Lint, Through Air Dried Tissue and Method of Forming the Same and filed on Apr. 27, 2016, the contents of which are incorporated herein by reference in their entirety.

FIELD OF THE INVENTION

The present invention is directed to tissue, and in particular to a multilayer tissue including wet end additives.

BACKGROUND

Across the globe there is great demand for disposable paper products such as sanitary tissue and facial tissue. In the North American market, the demand is increasing for higher quality products offered at a reasonable price point. The quality attributes most important for consumers of disposable sanitary tissue is softness and strength. Another attribute desired by consumers is low lint, which refers to the amount of fibers that are liberated from the product during use.

Fabric crepe is the process of using speed differential between a forming and structured fabric to facilitate filling the valleys of the structured fabric with fiber, and folding the web in the Z-direction to create thickness and influence surface topography. Conventional creping is the use of a doctor blade to remove a web that is adhered to a steam heated cylinder (yankee dryer), coated with an adhesive chemistry, in conjunction with speed differential between the yankee dryer and reel drum to fold the web in the Z-direction to create thickness, drape, and to influence the surface topography of the web. The process of calendering, pressing the web between cylinders, will also affect surface topography. The surface topography can also be influenced by the coarseness and stiffness of the fibers used in the web, degree of fiber refining, as well as embossing in the converting process. Added chemical softeners and lotions can also affect the perception of smoothness by creating a lubricious surface coating that reduces friction between the web and the skin of the consumer.

Lint, or the amount of fibers liberated from the web during use can be affected by many things such as the overall strength of the web, the incorporation of natural or synthetic binders (especially in outer surface of the web which is exposed to direct contact with the consumer), the smoothness of the outer surface of the web, the size of the fibers or stratification of the fibers throughout the web, and the geometry of the creping doctor used to crepe the sheet from the yankee dryer.

SUMMARY OF THE INVENTION

An object of the present invention is to provide a tissue manufacturing method that uses through air drying to produce a tissue with exceptional softness and low lint.

A multi-layer through air dried tissue according to an exemplary embodiment of the present invention comprises a first exterior layer, an interior layer and a second exterior layer. The interior layer includes a first wet end additive comprising an ionic surfactant and a second wet end additive comprising a non-ionic surfactant.

A multi-layer through air dried tissue according to another exemplary embodiment of the present invention comprises a first exterior layer comprised substantially of hardwood fibers, an interior layer comprised substantially of softwood fibers, and a second exterior layer comprised substantially of hardwood fibers. The interior layer includes a first wet end additive comprising an ionic surfactant and a second wet end additive comprising a non-ionic surfactant.

In at least one exemplary embodiment, the first exterior layer further comprises a wet end temporary wet strength additive.

In at least one exemplary embodiment, the first exterior layer further comprises a wet end dry strength additive.

In at least one exemplary embodiment, the second exterior layer further comprises a wet end dry strength additive.

In at least one exemplary embodiment, the second wet end additive comprises an ethoxylated vegetable oil.

In at least one exemplary embodiment, the second wet end additive comprises a combination of ethoxylated vegetable oils.

In at least one exemplary embodiment, the ratio by weight of the second wet end additive to the first wet end additive in the tissue is at least eight to one.

In at least one exemplary embodiment, the ratio by weight of the second wet end additive to the first wet end additive in the first interior layer is at most ninety to one.

In at least one exemplary embodiment, the ionic surfactant comprises a debonder.

In at least one exemplary embodiment, a 2-ply laminate of the tissue web has a softness (hand feel) of at least 91 HF.

In at least one exemplary embodiment, a 2-ply laminate of the tissue web has a bulk softness of less than 10 TS7.

In at least one exemplary embodiment, the wet end temporary wet strength additive comprises glyoxalated polyacrylamide.

In at least one exemplary embodiment, the wet end dry strength additive comprises amphoteric starch.

In at least one exemplary embodiment, the first exterior layer further comprises a dry strength additive.

In at least one exemplary embodiment, the first and second exterior layers are substantially free of any surface deposited softener agents or lotions.

In at least one exemplary embodiment, at least one of the first or second exterior layers comprises a surface deposited softener agent or lotion.

In at least one exemplary embodiment, the non-ionic surfactant has a hydrophilic-lipophilic balance of less than 10, and preferably less than 8.5.

In at least one exemplary embodiment, the first exterior layer is comprised of at least 20% by weight of softwood fibers.

In at least one exemplary embodiment, the interior layer is comprised of at least 75% by weight of softwood fibers.

A structured tissue according to an exemplary embodiment of the present invention comprises: a laminate of at least two plies of a multi-layer through air dried tissue, the structured tissue having a bulk softness of less than 10 TS7 and a lint value of 5.0 or less.

In at least one exemplary embodiment, the structured tissue has a softness value of 91.0 HF or greater.

Other features and advantages of embodiments of the invention will become readily apparent from the following detailed description, the accompanying drawings and the appended claims.

BRIEF DESCRIPTION OF THE DRAWINGS

Exemplary embodiments of the present invention will be described with references to the accompanying figures, wherein.

DETAILED DESCRIPTION

Manufacturers of disposable paper products have long recognized a strong consumer demand for tissues, such as bath tissues and facial tissues, that are both soft and strong. Softness refers to the tactile sensation or "hand feel" that a consumer perceives when using the tissue. The strength is the ability of a paper web to retain its physical integrity during use. In making a tissue that is both soft and strong, there is typically a tradeoff between strength and softness. For example, manufacturers may make a tissue softer by adding more hardwood, which tends to be softer due to shorter fibers in the wood, but this reduces sheet strength.

While consumers tend to prefer the softer tissues, consumers are sensitive to the lint that is commonly liberated (released) from the soft tissues during use and left behind as residue on the user's skin or clothing. Conventional techniques used to reduce lint also make the tissue considerably less soft. For example, adding dry strength additive or temporary wet strength additive to the tissue or increasing the amount of long fiber softwood used to make the tissue, reduces lint but causes the tissue to be less soft. For this reason, it is desirable to further reduce the amount of lint released from a soft and strong tissue.

The reduction in lint is achieved in the present invention by controlling the surface fiber bonding to prevent the surface fibers from breaking away when the tissue is used. As described in further detail herein, the surface fiber bonding is controlled, for example, by supplying additives at the multi-layer headbox or by polymer/fiber migration during sheet formation. The resulting tissue satisfies consumers who prefer a soft but strong tissue with very low levels of lint.

The present invention is directed to a soft structured tissue made with a combination of a wet end added ionic surfactant and a wet end added nonionic surfactant. The term "structured tissue" may refer to any tissue product made using a structuring fabric to develop a pattern in the tissue web in a papermaking process, such as, for example, TAD, UCTAD, ATMOS, NTT, or ETAD. The tissue may be made up of a number of layers, including exterior layers and an interior layer. In at least one exemplary embodiment, pulp mixes for each tissue layer are prepared individually.

Figure 1:
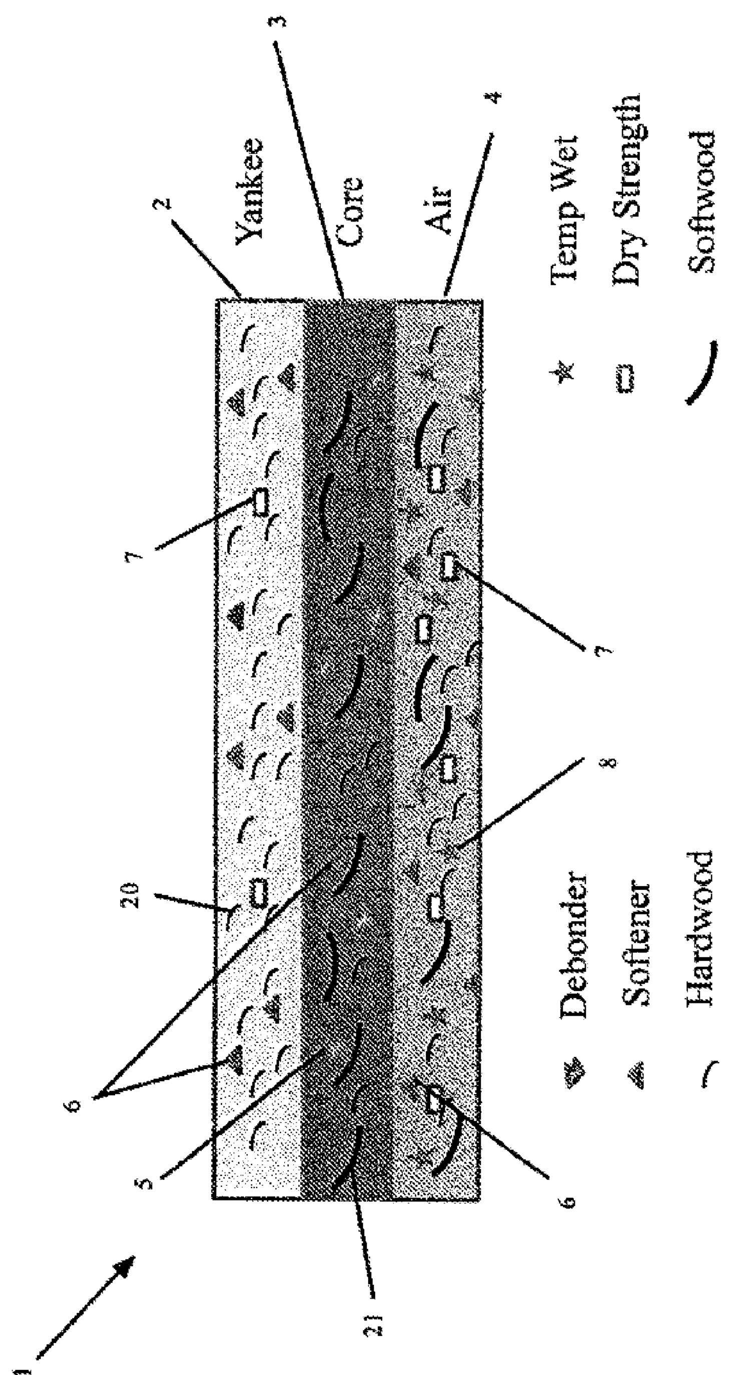
FIG. 1 is a schematic diagram of a three layer tissue in accordance with an exemplary embodiment of the present invention.

FIG. 1 shows a three layer tissue, generally designated by reference number 1, according to an exemplary embodiment of the present invention. The general structure and manufacturing process of the tissue 1 are as described in U.S. Pat. No. 8,968,517 (assigned to applicant), the contents of which are incorporated herein by reference in their entirety. The tissue 1 has external layers 2 and 4 as well as an internal, core layer 3. External layer 2 is composed primarily of hardwood fibers 20 whereas external layer 4 and core layer 3 are composed of a combination of hardwood fibers 20 and softwood fibers 21. The internal core layer 3 includes an ionic surfactant functioning as a debonder 5 and a non-ionic surfactant functioning as a softener 6. As explained in further detail below, external layers 2 and 4 also include non-ionic surfactant that migrated from the internal core layer 3 during formation of the tissue 1. External layer 2 further includes a dry strength additive 7. External layer 4 further includes both a dry strength additive 7 and a temporary wet strength additive 8.

Pulp mixes for exterior layers of the tissue are prepared with a blend of primarily hardwood fibers. For example, the pulp mix for at least one exterior layer is a blend containing about 70 percent or greater hardwood fibers relative to the total percentage of fibers that make up the blend. As a further example, the pulp mix for at least one exterior layer is a blend containing about 80 percent hardwood fibers relative to the total percentage of fibers that make up the blend.

Pulp mixes for the interior layer of the tissue are prepared with a blend of primarily softwood fibers. For example, the pulp mix for the interior layer is a blend containing about 70 percent or greater softwood fibers relative to the total percentage of fibers that make up the blend. As a further example, the pulp mix for the interior layer is a blend containing about 90-100 percent softwood fibers relative to the total percentage of fibers that make up the blend.

As known in the art, pulp mixes are subjected to a dilution stage in which water is added to the mixes so as to form a slurry. After the dilution stage but prior to reaching the headbox, each of the pulp mixes are dewatered to obtain a thick stock of about 95% water. In an exemplary embodiment of the invention, wet end additives are introduced into the thick stock pulp mixes of at least the interior layer. In an exemplary embodiment, a non-ionic surfactant and an ionic surfactant are added to the pulp mix for the interior layer. Suitable non-ionic surfactants have a hydrophilic-lipophilic balance of less than 10, and preferably less than or equal to 8.5. An exemplary non-ionic surfactant is an ethoxylated vegetable oil or a combination of two or more ethoxylated vegetable oils. Other exemplary non-ionic surfactants include ethylene oxide, propylene oxide adducts of fatty alcohols, alkylglycoside esters, and alkylethoxylated esters.

Suitable ionic surfactants include but are not limited to quaternary amines and cationic phospholipids. An exemplary ionic surfactant is 1,2-di(heptadecyl)-3-methyl-4,5-dihydroimidazol-3-ium methyl sulfate. Other exemplary ionic surfactants include (2-hydroxyethyl)methylbis[2-[(1-oxooctadecyl)oxy] ethyl] ammonium methyl sulfate, fatty dialkyl amine quaternary salts, mono fatty alkyl tertiary amine salts, unsaturated fatty alkyl amine salts, linear alkyl sulfonates, alkyl-benzene sulfonates and trimethyl-3-[(1-oxooctadecyl)amino]propylammonium methyl sulfate.

In an exemplary embodiment, the ionic surfactant may function as a debonder while the non-ionic surfactant functions as a softener. Typically, the debonder operates by breaking bonds between fibers to provide flexibility, however an unwanted side effect is that the overall strength of the tissue can be reduced by excessive exposure to debonder. Typical debonders are quaternary amine compounds such as trimethyl cocoammonium chloride, trymethyloleylammonium chloride, dimethyldi(hydrogenated-tallow)ammonium chloride and trimethylstearylammonium chloride.

After being added to the interior layer, the non-ionic surfactant (functioning as a softener) migrates through the other layers of the tissue while the ionic surfactant (functioning as a debonder) stays relatively fixed within the interior layer. Since the debonder remains substantially within the interior layer of the tissue, softer hardwood fibers (that may have lacked sufficient tensile strength if treated with a debonder) can be used for the exterior layers. Further, because only the interior of the tissue is treated, less debonder is required as compared to when the whole tissue is treated with debonder.

In an exemplary embodiment, the ratio of ionic surfactant to non-ionic surfactant added to the pulp mix for the interior layer of the tissue is between 1:4 and 1:90 parts by weight and preferably about 1:8 parts by weight. In particular, when the ionic surfactant is a quaternary amine debonder, reducing the concentration relative to the amount of non-ionic surfactant can lead to an improved tissue. Excess debonder, particularly when introduced as a wet end additive, can weaken the tissue, while an insufficient amount of debonder may not provide the tissue with sufficient flexibility. Because of the migration of the non-ionic surfactant to the exterior layers of the tissue, the ratio of ionic surfactant to non-ionic surfactant in the core layer may be significantly lower in the actual tissue compared to the pulp mix.

In an exemplary embodiment, a dry strength additive is added to the thick stock mix for at least one of the exterior layers. The dry strength additive may be, for example, amphoteric starch, added in a range of about 1 to 40 kg/ton. In another exemplary embodiment, a wet strength additive is added to the thick stock mix for at least one of the exterior layers. The wet strength additive may be, for example, glyoxalated polyacrylamide, commonly known as GPAM, added in a range of about 0.25 to 5 kg/ton. In a further exemplary embodiment, both a dry strength additive, preferably amphoteric starch and a wet strength additive, preferably GPAM are added to one of the exterior layers. Without being bound by theory, it is believed that the combination of both amphoteric starch and GPAM in a single layer when added as wet end additives provides a synergistic effect with regard to strength of the finished tissue to reduce linting. Other exemplary temporary wet-strength agents include aldehyde functionalized cationic starch, aldehyde functionalized polyacrylamides, acrolein co-polymers and cis-hydroxyl polysachharide (guar gum and locust bean gum) used in combination with any of the above mentioned compounds.

In addition to amphoteric starch, suitable dry strength additives may include but are not limited to glyoxalated polyacrylamide, cationic starch, carboxy methyl cellulose, guar gum, locust bean gum, cationic polyacrylamide, polyvinyl alcohol, anionic polyacrylamide or a combination thereof.

Figure 2:
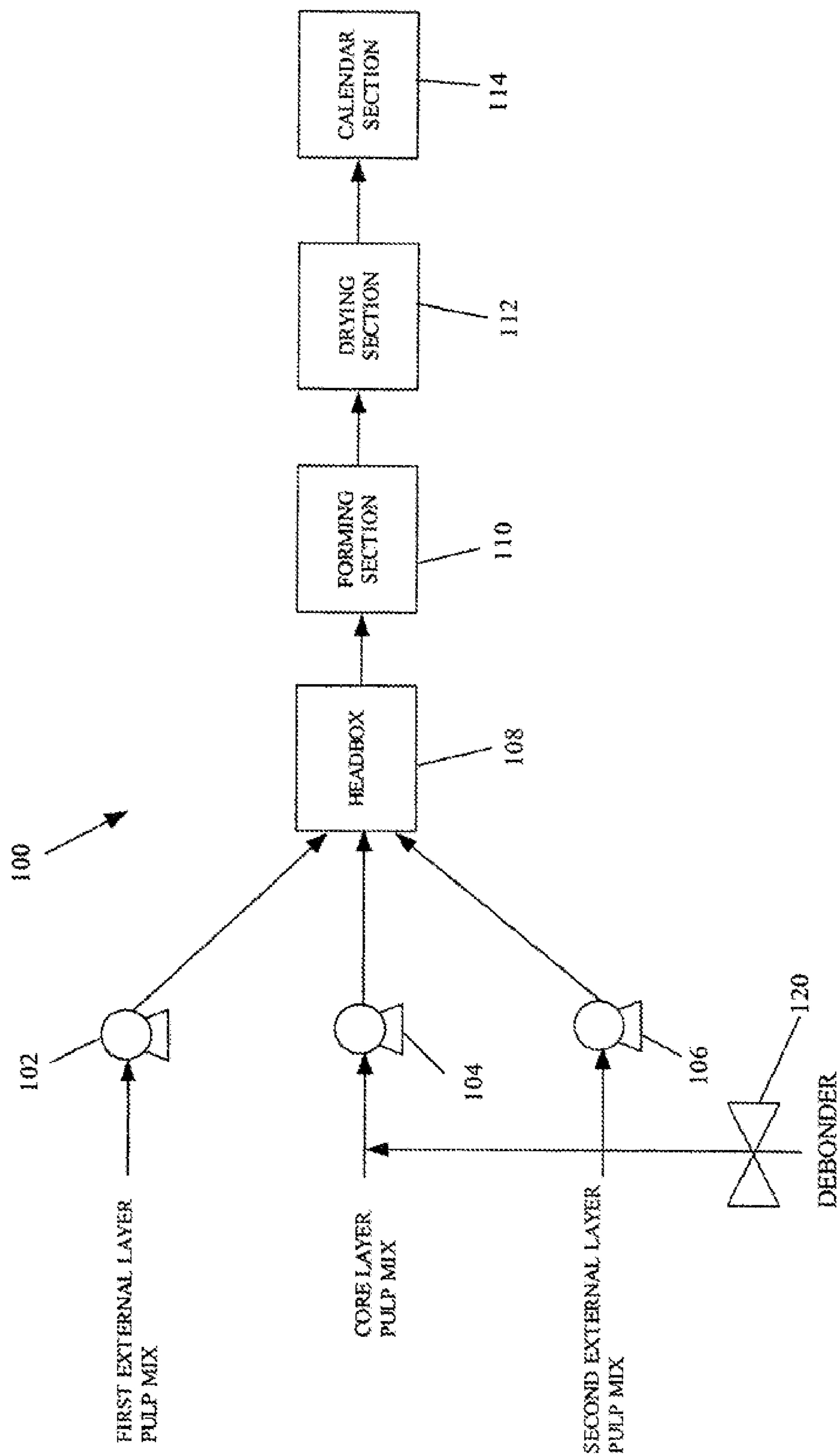
FIG. 2 is a block diagram of a system for manufacturing a single ply of the multi-ply tissue according to an exemplary embodiment of the present invention.
Figure 3:
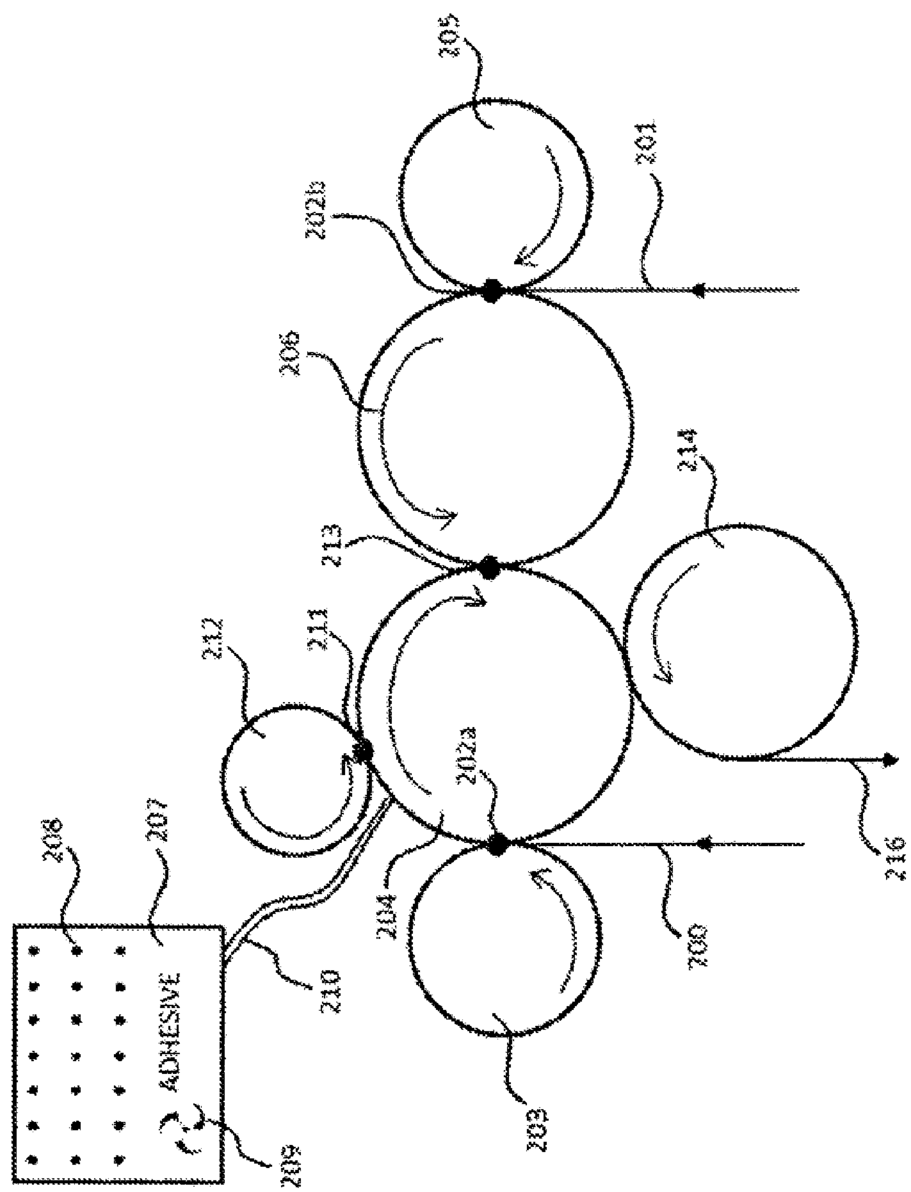
FIG. 3 is a block diagram of a system for manufacturing a multi-ply tissue from the single plies of tissue according to an exemplary embodiment of the present invention.

FIG. 2 is a block diagram of a system for manufacturing tissue, generally designated by reference number 100, according to an exemplary embodiment of the present invention. The system 100 includes an first exterior layer fan pump 102, a core layer fan pump 104, a second exterior layer fan pump 106, a headbox 108, a forming section 110, a drying section 112 and a calendar section 114. The first and second exterior layer fan pumps 102, 106 deliver the pulp mixes of the first and second external layers 2, 4 to the headbox 108, and the core layer fan pump 104 delivers the pulp mix of the core layer 3 to the headbox 108. As is known in the art, the headbox delivers a wet web of pulp onto a forming wire within the forming section 110. The wet web is laid on the forming wire with the core layer 3 disposed between the first and second external layers 2, 4.

After formation in the forming section 110, the partially dewatered web is transferred to the drying section 112, Within the drying the section 112, the tissue of the present invention may be dried using conventional through air drying processes. In an exemplary embodiment, the tissue of the present invention is dried to a humidity of about 7 to 20% using a through air drier manufactured by Metso Corporation, of Helsinki, Finland. In another exemplary embodiment of the invention, two or more through air drying stages are used in series. Without being bound by theory, it is believed that the use of multiple drying stages improves uniformity in the tissue, thus reducing tears.

In an exemplary embodiment, the tissue of the present invention is patterned during the through air drying process. Such patterning can be achieved through the use of a TAD fabric, such as a G-weave (Prolux 003) or M-weave (Prolux 005) TAD fabric.

After the through air drying stage, the tissue of the present invention may be further dried in a second phase using a Yankee drying drum. In an exemplary embodiment, a creping adhesive is applied to the drum prior to the tissue contacting the drum. The tissue adheres to the drum and is removed using a wear resistant coated creping blade with a creping shelf of 0.5 mm or less. The creping doctor set up angle is preferably 10 to 35 degrees, while the blade bevel is preferably 55 to 80 degrees.

Figure 4:
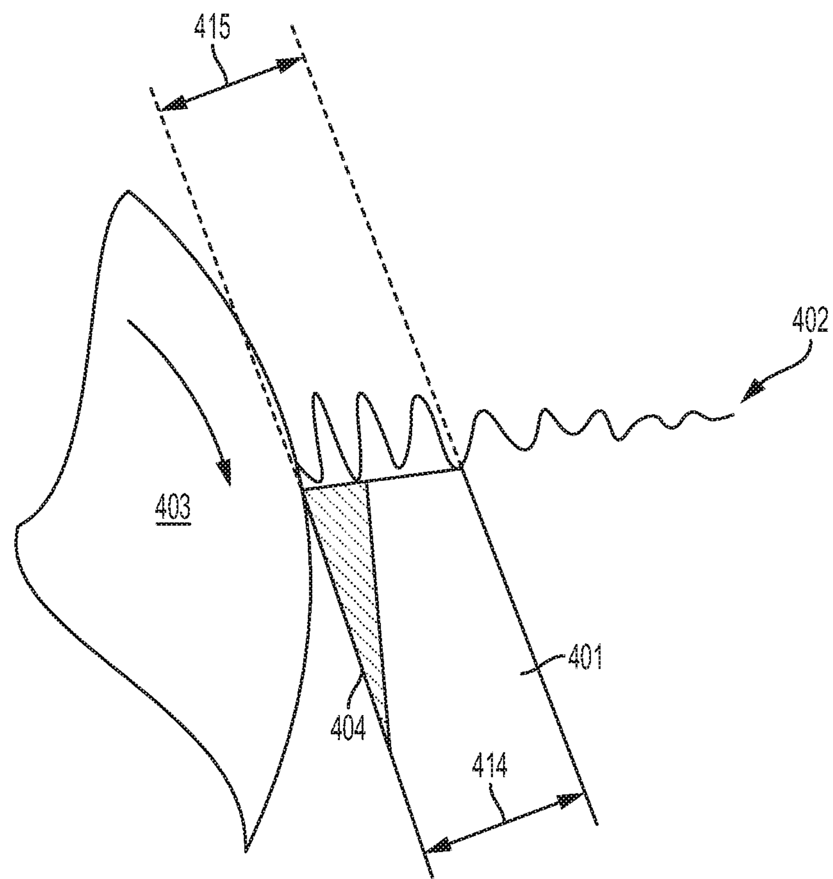
FIG. 4 illustrates a conventional creping blade.

To further illustrate the creping process, FIG. 4 shows a conventional creping blade application wherein a creping blade 401 is pressed against a steam heated drum 403 in order to crepe a tissue web 402. The blade 401 may be provided with a wear resistant material 404 at the blade tip. The available distance on the blade available for contact with the paper web is called the distance of the creping shelf or creping shelf distance. In FIG. 4 showing a conventional creping blade application, the distance of the creping shelf 415 is the same as the thickness of the creping blade 414.

Figure 5:
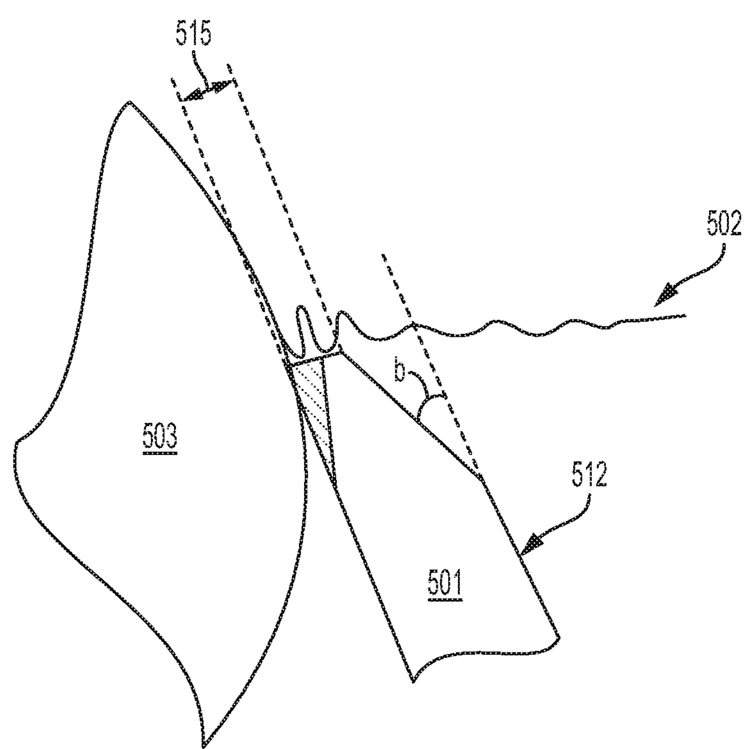
FIG. 5 illustrates an example of a creping blade according to an exemplary embodiment of the present invention.

In the creping process used in accordance with an exemplary embodiment of the present invention, as shown in FIG. 5, the distance of the creping shelf 515 has been reduced to 0.5 mm or less by beveling the non-contacting face of the blade 512. The angle of the bevel b is selected to obtain the desired creping shelf distance. It has been discovered that the distance of the creping shelf 515 can influence the web properties including tensile, bulk, and lint since the distance of the creping shelf directly influences the contact time between the blade 512 and web 502 and thus the forces imparted to the web by the blade. For example, it has been observed that as the creping shelf distance is decreased, there is a less tensile destruction at the blade and also a higher bulk generation.

Figure 6:
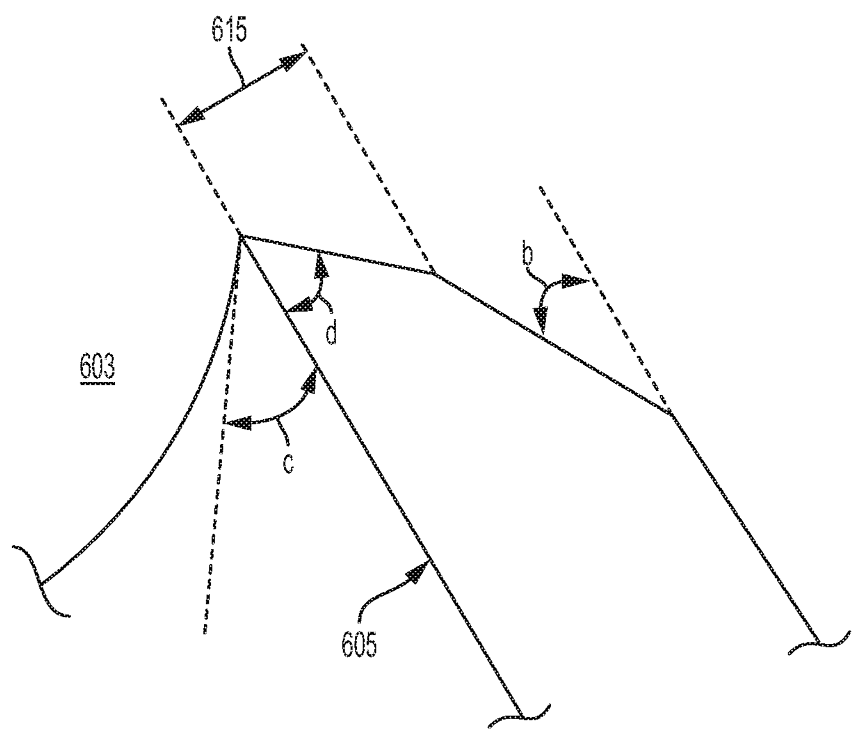
FIG. 6 illustrates an example of a creping blade according to another exemplary embodiment of the present invention.

In another exemplary embodiment, as shown in FIG. 6, a 25 degree blade set up angle c, which is measured from a normal line at the contact point between the blade tip and the drum to the face of the creping blade 605, a wear resistant coated tip blade with an 80 degree blade bevel d, and a 0.5 mm creping shelf distance 615 is utilized.

The wear resistant material is suitably a ceramic material, a cermet material, or a carbide material. For example, the wear resistant material may be selected from metal oxides, ceramic materials, silicates, carbides, borides, nitrides, and mixtures thereof. Particular examples of suitable wear resistant materials are alumina, chromia, zirconia, tungsten carbide, chromium carbide, zirconium carbide, tantalum carbide, titanium carbide, and mixtures thereof The wear-resistant material is applied by thermal spraying, physical vapor deposition, or chemical vapor deposition.

The tissue may then be calendered in a subsequent stage within the calendar section 114. According to an exemplary embodiment, calendaring may be accomplished using a number of calendar rolls (not shown) that deliver a calendering pressure in the range of 0-100 pounds per linear inch (PLI). In general, increased calendering pressure is associated with reduced caliper and a smoother tissue surface.

According to an exemplary embodiment of the invention, a ceramic coated creping blade is used to remove the tissue from the Yankee drying drum. Ceramic coated creping blades result in reduced adhesive build up and aid in achieving higher run speeds. Without being bound by theory, it is believed that the ceramic coating of the creping blades provides a less adhesive surface than metal creping blades and is more resistant to edge wear that can lead to localized spots of adhesive accumulation. The ceramic creping blades allow for a greater amount of creping adhesive to be used which in turn provides improved sheet integrity and faster run speeds.

In addition to the use of wet end additives, the tissue of the present invention may also be treated with topical or surface deposited additives. Examples of surface deposited additives include softeners for increasing fiber softness and skin lotions. Examples of topical softeners include but are not limited to quaternary ammonium compounds, including, but not limited to, the dialkyldimethylammonium salts (e.g. ditallowdimethylammonium chloride, ditallowdimethylammonium methyl sulfate, di(hydrogenated tallow)dimethyl ammonium chloride, etc.). Another class of chemical softening agents include the well-known organo-reactive polydimethyl siloxane ingredients, including amino functional polydimethyl siloxane. zinc stearate, aluminum stearate, sodium stearate, calcium stearate, magnesium stearate, spermaceti, and steryl oil.

After the tissue basesheet is produced a laminate, composed of two webs/plies are laminated together in a face-to face relationship using an aqueous adhesive. The adhesives used to laminate the plies of absorbent structure can be water soluble of the group consisting of polyvinyl alcohol, polyvinyl acetate, starch based or mixtures thereof. The mixture is comprised of 1% to 10% by weight of the adhesives. Additionally; the mixture can contain up 10% by weight of a water soluble cationic resin selected from the group consisting of polyamide-epichlorohydrin resins, glyoxalated polyacrylamide resins, polyethyleneimine resins, polyethylenimine resins, or mixtures thereof. The remainder of the mixture is composed of water. This mixture is heated and maintained to a temperature between 90 deg F. to 150 deg F., preferably to 120 F.

The adhesive is heated and maintained at temperature utilizing an insulated stainless steel tank with heating elements uniformly distributed throughout the interior heating surface. The large amount of surface area heated provides uniform heating controlled by an adjustable thermostat. The tank is designed with an agitator that to ensure proper mixing and heat transfer.

The adhesive is applied using an applicator roll, aligned in an axially parallel arrangement with one of the two embossing rolls forming a nip therewith, such that the adhesive applicator roll is upstream of the nip formed between the two embossing rolls. The adhesive applicator roll transfers adhesive to the embossed webs on the embossing roll at the crests of the embossing knobs. The crests of the embossing knobs typically do not touch the perimeter of the opposing roll at the nip formed therebetween necessitating the addition of a marrying roll to apply pressure for lamination. The marrying roll forms a nip with the same embossing roll forming the nip with the adhesive applicator roll, downstream of the nip formed between the two embossing rolls.

According to an exemplary embodiment of the invention, the paper web on the converting lines may be treated with corona discharge before the embossing section. This treatment may be applied to the top ply and/or bottom ply. Nano cellulose fibers (NCF), nano crystalline cellulose (NCC), micro-fibrillated cellulose (MCF) and other shaped natural and synthetic fibers may be blown on to the paper web using a blower system immediately after corona treatment. This enables the nano-fibers to adsorb on to the paper web through electro-static interactions As discussed, according to an exemplary embodiment of the invention, a debonder is added to at least the interior layer as a wet end additive. The debonder provides flexibility to the finished tissue product. However, the debonder also reduces the strength of the tissue web, which at times may result in sheet breaks during the manufacturing process. The relative softness of the tissue web results in inefficiencies in the rewind process that must be performed in order to correct a sheet break. Accordingly, as shown in FIG. 2, in an exemplary embodiment of the present invention, a switching valve 120 is used to control delivery of the debonder as a wet-end additive to the interior layer. In particular, when a sheet break is detected using, for example, conventional sheet break detection sensors, the switching valve 120 may be controlled to prevent further delivery of the debonder. This results in less flexibility and increased strength at the portion of the tissue web to be rewound, thereby allowing for a more efficient rewind process. Once the rewind process is completed, the switching valve may be opened to continue delivery of the debonder.

In addition to the use of a sheet break detection sensor, the switching valve 120 may also be controlled during turn up, the process whereby the tissue web is one transferred from on roll to another. The turn up process can result in higher stresses on the tissue web that normal operation, thus increasing the chance of sheet breaks. The switching valve 120 is turned off prior to turn up, thus increasing the strength of the tissue web. After the tissue web has begun winding on a new roll, the switching valve 120 is turned on again. The resulting roll of basesheet material thus has a section of higher strength tissue web at the center of the roll and may have a section of higher strength tissue on the outside of the roll. During finishing, the exterior section of higher strength tissue is removed and recycled. The interior section of higher strength tissue is not used to make a finished tissue. Thus, only the portion of the roll of basesheet tissue containing debonder is used to make finished tissue.

The below discussed values for basis weights, ball burst, MD and CD stretch and tensile strength, caliper, lint and softness of the inventive tissue were determined using the following test procedures:

Softness Testing

Softness of a 2-ply tissue web was determined using a Tissue Softness Analyzer (TSA), available from EMTEC Electronic GmbH of Leipzig, Germany. The TSA comprises a rotor with vertical blades which rotate on the test piece to apply a defined contact pressure. Contact between the vertical blades and the test piece creates vibrations which are sensed by a vibration sensor. The sensor then transmits a signal to a PC for processing and display. The frequency analysis in the range of approximately 200 to 1000 Hz represents the surface smoothness or texture of the test piece and is referred to as the TS750 value. A further peak in the frequency range between 6 and 7 kHz represents the bulk softness of the test piece and is referred to as the TS7 value. Both TS7 and TS750 values are expressed as dB $V^2$ rms. The stiffness of the sample is also calculated as the device measures deformation of the sample under a defined load. The stiffness value (D) is expressed as mm/N. The device also calculates a Hand Feel (HF) number with the value corresponding to a softness as perceived when someone touches a tissue sample by hand (the higher the HF number, the higher the softness). The HF number is a combination of the TS750, TS7, and stiffness of the sample measured by the TSA and calculated using an algorithm which also requires the caliper and basis weight of the sample. Different algorithms can be selected for different facial, toilet, and towel paper products. Before testing, a calibration check should be performed using “TSA Leaflet Collection No. 9” available from EMTECH dated 2016 May 10. If the calibration check demonstrates a calibration is necessary, “TSA Leaflet Collection No. 10” is followed for the calibration procedure available from EMTECH dated 2015 Sep. 9.

A punch was used to cut out five 100 $cm^2$ round samples from the web. One of the samples was loaded into the TSA, clamped into place (outward facing or embossed ply facing upward), and the TPII algorithm was selected from the list of available softness testing algorithms displayed by the TSA. After inputting parameters for the sample (including caliper and basis weight), the TSA measurement program was run. The test process was repeated for the remaining samples and the results for all the samples were averaged and the average HF number recorded Ball Burst Testing Ball Burst of a 2-ply tissue web was determined using a Tissue Softness Analyzer (TSA), available from EMTECH Electronic GmbH of Leipzig, Germany using a ball burst head and holder. A punch was used to cut out five 100 $cm^2$ round samples from the web. One of the samples was loaded into the TSA, with the embossed surface facing down, over the holder and held into place using the ring. The ball burst algorithm was selected from the list of available softness testing algorithms displayed by the TSA. The ball burst head was then pushed by the EMTECH through the sample until the web ruptured and the grams force required for the rupture to occur was calculated. The test process was repeated for the remaining samples and the results for all the samples were averaged.

Stretch & MD, CD, and Wet CD Tensile Strength Testing

An Instron 3343 tensile tester, manufactured by Instron of Norwood, Mass., USA, with a 100N load cell and 25.4 mm rubber coated jaw faces was used for tensile strength measurement. Prior to measurement, the Instron 3343 tensile tester was calibrated. After calibration, 8 strips of 2-ply product, each one inch by four inches, were provided as samples for each test. When testing MD, the strips were cut in the MD direction and in the CD direction when testing CD. One of the sample strips was placed in between the upper jaw faces and clamp, and then between the lower jaw faces and clamp with a gap of 2 inches between the clamps. A test was run on the sample strip to obtain tensile and stretch. The test procedure was repeated until all the samples were tested. The values obtained for the eight sample strips were averaged to determine the tensile strength of the tissue. When testing CD wet tensile, the strips were placed in an oven at 105 deg Celsius for 5 minutes and saturated with 75 microliters of deionized water immediately prior to pulling the sample.

Lint Testing

The amount of lint generated from a tissue product was determined with a Sutherland Rub Tester. This tester uses a motor to rub a weighted felt 5 times over the stationary tissue. The Hunter Color L value is measured before and after the rub test. The difference between these two Hunter Color L values is calculated as lint.

Lint Testing—Sample Preparation:

Prior to the lint rub testing, the paper samples to be tested should be conditioned according to Tappi Method #T402OM-88. Here, samples are preconditioned for 24 hours at a relative humidity level of 10 to 35% and within a temperature range of 22° to 40° C. After this preconditioning step, samples should be conditioned for 24 hours at a relative humidity of 48 to 52% and within a temperature range of 22° to 24° C. This rub testing should also take place within the confines of the constant temperature and humidity room.

The Sutherland Rub Tester may be obtained from Testing Machines, Inc. (Amityville, N.Y. 11701). The tissue is first prepared by removing and discarding any product which might have been abraded in handling, e.g. on the outside of the roll. For multi-ply finished product, three sections with each containing two sheets of multi-ply product are removed and set on the bench-top. For single-ply product, six sections with each containing two sheets of single-ply product are removed and set on the bench-top. Each sample is then folded in half such that the crease is running along the cross direction (CD) of the tissue sample. For the multi-ply product, make sure one of the sides facing out is the same side facing out after the sample is folded. In other words, do not tear the plies apart from one another and rub test the sides facing one another on the inside of the product. For the single-ply product, make up 3 samples with the off-Yankee side out and 3 with the Yankee side out. Keep track of which samples are Yankee side out and which are off-Yankee side out.

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.5"×6". Puncture two holes into each of the six cards by forcing the cardboard onto the hold down pins of the Sutherland Rub tester.

If working with single-ply finished product, center and carefully place each of the 2.5"×6" cardboard pieces on top of the six previously folded samples. Make sure the 6" dimension of the cardboard is running parallel to the machine direction (MD) of each of the tissue samples. If working with multi-ply finished product, only three pieces of the 2.5"×6" cardboard will be required. Center and carefully place each of the cardboard pieces on top of the three previously folded samples. Once again, make sure the 6" dimension of the cardboard is running parallel to the machine direction (MD) of each of the tissue samples.

Fold one edge of the exposed portion of tissue sample onto the back of the cardboard. Secure this edge to the cardboard with adhesive tape obtained from 3M Inc. (¾"

wide Scotch Brand, St. Paul, Minn.). Carefully grasp the other over-hanging tissue edge and snugly fold it over onto the back of the cardboard. While maintaining a snug fit of the paper onto the board, tape this second edge to the back of the cardboard. Repeat this procedure for each sample.

Turn over each sample and tape the cross direction edge of the tissue paper to the cardboard. One half of the adhesive tape should contact the tissue paper while the other half is adhering to the cardboard. Repeat this procedure for each of the samples. If the tissue sample breaks, tears, or becomes frayed at any time during the course of this sample preparation procedure, discard and make up a new sample with a new tissue sample strip.

If working with multi-ply converted product, there will now be 3 samples on the cardboard. For single-ply finished product, there will now be 3 off-Yankee side out samples on cardboard and 3 Yankee side out samples on cardboard.

Lint Testing—Felt Preparation

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.25"×7.25". Draw two lines parallel to the short dimension and down 1.125" from the top and bottom most edges on the white side of the cardboard. Carefully score the length of the line with a razor blade using a straight edge as a guide. Score it to a depth about half way through the thickness of the sheet. This scoring allows the cardboard/felt combination to fit tightly around the weight of the Sutherland Rub tester. Draw an arrow running parallel to the long dimension of the cardboard on this scored side of the cardboard.

Cut the six pieces of black felt (F-55 or equivalent from New England Gasket, 550 Broad Street, Bristol, Conn. 06010) to the dimensions of 2.25"×8.5"×0.0625. Place the felt on top of the unscored, green side of the cardboard such that the long edges of both the felt and cardboard are parallel and in alignment. Make sure the fluffy side of the felt is facing up. Also allow about 0.5" to overhang the top and bottom most edges of the cardboard. Snuggly fold over both overhanging felt edges onto the backside of the cardboard with Scotch brand tape. Prepare a total of six of these felt/cardboard combinations.

For best reproducibility, all samples should be run with the same lot of felt. Obviously, there are occasions where a single lot of felt becomes completely depleted. In those cases where a new lot of felt must be obtained, a correction factor should be determined for the new lot of felt. To determine the correction factor, obtain a representative single tissue sample of interest, and enough felt to make up 24 cardboard/felt samples for the new and old lots.

As described below and before any rubbing has taken place, obtain Hunter L readings for each of the 24 cardboard/felt samples of the new and old lots of felt. Calculate the averages for both the 24 cardboard/felt samples of the old lot and the 24 cardboard/felt samples of the new lot.

Next, rub test the 24 cardboard/felt boards of the new lot and the 24 cardboard/felt boards of the old lot as described below. Make sure the same tissue lot number is used for each of the 24 samples for the old and new lots. In addition, sampling of the paper in the preparation of the cardboard/tissue samples must be done so the new lot of felt and the old lot of felt are exposed to as representative as possible of a tissue sample. For the case of 1-ply tissue product, discard any product which might have been damaged or abraded. Next, obtain 48 strips of tissue each two usable units (also termed sheets) long. Place the first two usable unit strip on the far left of the lab bench and the last of the 48 samples on the far right of the bench. Mark the sample to the far left with the number “1” in a 1 cm by 1 cm area of the corner of the sample. Continue to mark the samples consecutively up to 48 such that the last sample to the far right is numbered 48.

Use the 24 odd numbered samples for the new felt and the 24 even numbered samples for the old felt. Order the odd number samples from lowest to highest. Order the even numbered samples from lowest to highest. Now, mark the lowest number for each set with a letter “Y.” Mark the next highest number with the letter “0.” Continue marking the samples in this alternating “Y”/“O” pattern. Use the “Y” samples for yankee side out lint analyses and the “0” samples for off-Yankee side lint analyses. For 1-ply product, there are now a total of 24 samples for the new lot of felt and the old lot of felt. Of this 24, twelve are for yankee side out lint analysis and 12 are for off-yankee side lint analysis.

Rub and measure the Hunter Color L values for all 24 samples of the old felt as described below. Record the 12 yankee side Hunter Color L values for the old felt. Average the 12 values. Record the 12 off-yankee side Hunter Color L values for the old felt. Average the 12 values. Subtract the average initial un-rubbed Hunter Color L felt reading from the average Hunter Color L reading for the yankee side rubbed sambles. This is the delta average difference for the yankee side samples. Subtract the average initial un-rubbed Hunter Color L felt reading from the average Hunter Color L reading for the off-yankee side rubbed sambles. This is the delta average difference for the off-yankee side samples. Calculate the sum of the delta average difference for the yankee-side and the delta average difference for the off-yankee side and divide this sum by 2. This is the uncorrected lint value for the old felt. If there is a current felt correction factor for the old felt, add it to the uncorrected lint value for the old felt. This value is the corrected Lint Value for the old felt.

Rub and measure the Hunter Color L values for all 24 samples of the new felt as described below. Record the 12 yankee side Hunter Color L values for the new felt. Average the 12 values. Record the 12 off-yankee side Hunter Color L values for the new felt. Average the 12 values. Subtract the average initial un-rubbed Hunter Color L felt reading from the average Hunter Color L reading for the yankee side rubbed sambles. This is the delta average difference for the yankee side samples. Subtract the average initial un-rubbed Hunter Color L felt reading from the average Hunter Color L reading for the off-yankee side rubbed samples. This is the delta average difference for the off-yankee side samples. Calculate the sum of the delta average difference for the yankee-side and the delta average difference for the off-yankee side and divide this sum by 2. This is the uncorrected lint value for the new felt.

Take the difference between the corrected Lint Value from the old felt and the uncorrected lint value for the new felt. This difference is the felt correction factor for the new lot of felt.

Adding this felt correction factor to the uncorrected lint value for the new felt should be identical to the corrected Lint Value for the old felt.

The same type procedure is applied to two-ply tissue product with 24 samples run for the old felt and 24 run for the new felt. But, only the consumer used outside layers of the plies are rub tested. As noted above, make sure the samples are prepared such that a representative sample is obtained for the old and new felts.

Lint Testing—Care of 4 Pound Weight

The four pound weight has four square inches of effective contact area providing a contact pressure of one pound per square inch. Since the contact pressure can be changed by alteration of the rubber pads mounted on the face of the weight, it is important to use only the rubber pads supplied by the manufacturer (Brown Inc., Mechanical Services Department, Kalamazoo, Mich.). These pads must be replaced if they become hard, abraded or chipped off.

When not in use, the weight must be positioned such that the pads are not supporting the full weight of the weight. It is best to store the weight on its side.

Lint Testing—Rub Tester Instrument Calibration

The Sutherland Rub Tester must first be calibrated prior to use. First, turn on the Sutherland Rub Tester by moving the tester switch to the "cont" position. When the tester arm is in its position closest to the user, turn the tester's switch to the "auto" position. Set the tester to run 5 strokes by moving the pointer arm on the large dial to the "five" position setting. One stroke is a single and complete forward and reverse motion of the weight. The end of the rubbing block should be in the position closest to the operator at the beginning and at the end of each test.

Prepare a tissue paper on cardboard sample as described above. In addition, prepare a felt on cardboard sample as described above. Both of these samples will be used for calibration of the instrument and will not be used in the acquisition of data for the actual samples.

Place this calibration tissue sample on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface. Activate the tester by depressing the "push" button.

Keep a count of the number of strokes and observe and make a mental note of the starting and stopping position of the felt covered weight in relationship to the sample. If the total number of strokes is five and if the end of the felt covered weight closest to the operator is over the cardboard of the tissue sample at the beginning and end of this test, the tester is calibrated and ready to use. If the total number of strokes is not five or if the end of the felt covered weight closest to the operator is over the actual paper tissue sample either at the beginning or end of the test, repeat this calibration procedure until 5 strokes are counted the end of the felt covered weight closest to the operator is situated over the cardboard at the both the start and end of the test.

During the actual testing of samples, monitor and observe the stroke count and the starting and stopping point of the felt covered weight. Recalibrate when necessary.

Lint Testing—Hunter Color Meter Calibration

Adjust the Hunter Color Difference Meter for the black and white standard plates according to the procedures outlined in the operation manual of the instrument. Also run the stability check for standardization as well as the daily color stability check if this has not been done during the past eight hours. In addition, the zero reflectance must be checked and readjusted if necessary.

Place the white standard plate on the sample stage under the instrument port. Release the sample stage and allow the sample plate to be raised beneath the sample port.

Using the "L-Y", "a-X", and "b-Z" standardizing knobs, adjust the instrument to read the Standard White Plate Values of "L", "a", and "b" when the "L", "a", and "b" push buttons are depressed in turn.

Lint Testing—Measurement of Samples

The first step in the measurement of lint is to measure the Hunter color values of the black felt/cardboard samples prior to being rubbed on the tissue. The first step in this measurement is to lower the standard white plate from under the instrument port of the Hunter color instrument. Center a felt covered cardboard, with the arrow pointing to the back of the color meter, on top of the standard plate. Release the sample stage, allowing the felt covered cardboard to be raised under the sample port.

Since the felt width is only slightly larger than the viewing area diameter, make sure the felt completely covers the viewing area. After confirming complete coverage, depress the L push button and wait for the reading to stabilize. Read and record this L value to the nearest 0.1 unit.

If a D25D2A head is in use, lower the felt covered cardboard and plate, rotate the felt covered cardboard 90 degrees so the arrow points to the right side of the meter. Next, release the sample stage and check once more to make sure the viewing area is completely covered with felt. Depress the L push button. Read and record this value to the nearest 0.1 unit. For the D25D2M unit, the recorded value is the Hunter Color L value. For the D25D2A head where a rotated sample reading is also recorded, the Hunter Color L value is the average of the two recorded values.

Measure the Hunter Color L values for all of the felt covered cardboards using this technique. If the Hunter Color L values are all within 0.3 units of one another, take the average to obtain the initial L reading. If the Hunter Color L values are not within the 0.3 units, discard those felt/cardboard combinations outside the limit. Prepare new samples and repeat the Hunter Color L measurement until all samples are within 0.3 units of one another.

For the measurement of the actual tissue paper/cardboard combinations, place the tissue sample/cardboard combination on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface.

Next, activate the tester by depressing the "push" button. At the end of the five strokes the tester will automatically stop. Note the stopping position of the felt covered weight in relation to the sample. If the end of the felt covered weight toward the operator is over cardboard, the tester is operating properly. If the end of the felt covered weight toward the operator is over sample, disregard this measurement and recalibrate as directed above in the Sutherland Rub Tester Calibration section.

Remove the weight with the felt covered cardboard. Inspect the tissue sample. If torn, discard the felt and tissue and start over. If the tissue sample is intact, remove the felt covered cardboard from the weight. Determine the Hunter Color L value on the felt covered cardboard as described above for the blank felts. Record the Hunter Color L readings for the felt after rubbing. Rub, measure, and record the Hunter Color L values for all remaining samples.

After all tissues have been measured, remove and discard all felt. Felts strips are not used again. Cardboards are used until they are bent, torn, limp, or no longer have a smooth surface.

Lint Testing—Calculations

Determine the delta L values by subtracting the average initial L reading found for the unused felts from each of the measured values for the off-Yankee and Yankee sides of the sample. Recall, multi-ply-ply product will only rub one side of the paper. Thus, three delta L values will be obtained for the multi-ply product. Average the three delta L values and subtract the felt factor from this final average. This final result is termed the lint for the fabric side of the 2-ply product.

For the single-ply product where both Yankee side and off-Yankee side measurements are obtained, subtract the average initial L reading found for the unused felts from each of the three Yankee side L readings and each of the three off-Yankee side L readings. Calculate the average delta for the three Yankee side values. Calculate the average delta for the three fabric side values. Subtract the felt factor from each of these averages. The final results are termed a lint for the fabric side and a lint for the Yankee side of the single-ply product. By taking the average of these two values, an ultimate lint value is obtained for the entire single-ply product.

Basis Weight

Using a dye and press, six 76.2 mm by 76.2 mm square samples were cut from a 2-ply product being careful to avoid any web perforations. The samples were placed in an oven at 105 deg C for 5 minutes before being weighed on an analytical balance to the fourth decimal point. The weight of the sample in grams was divided by $(0.0762\ m)^2$ to determine the basis weight in grams/$m^2$.

Caliper Testing

A Thwing-Albert ProGage 100 Thickness Tester, manufactured by Thwing Albert of West Berlin, N.J. was used for the caliper test. Eight 100 mm×100 mm square samples were cut from a 2-ply product. The samples were then tested individually and the results were averaged to obtain a caliper result for the base sheet.

The following two Examples illustrate the advantages of the present invention.

Example

2-Ply Laminate Tissue with HF >91.0 and Lint Value <5.0

Two webs of through air dried tissue were laminated to produce a roll of 2-ply sanitary (bath) tissue with 190 sheets each 4.0 inches long and 4.0 inches wide. The laminate was rolled on a roll that was 121 mm in diameter. The 2-ply tissue had the following product attributes: a Basis Weight of 37.8 g/$m^2$, a Caliper of 0.517 mm, an MD tensile of 150 N/m, a CD tensile of 83 N/m, a ball burst of 195 grams force, a lint value of 4.86, an MD stretch of 13.4%, a CD stretch of 6.4%, a CD wet tensile of 9 N/m, a HF of 91.9 and a TS7 of 8.26.

Each tissue web was multilayered with the fiber and chemistry of each layer selected and prepared individually to maximize product quality attributes of softness and strength. The first exterior layer, which was the layer that contacted the Yankee dryer, was prepared using 80% eucalyptus with 0.25 kg/ton of the amphoteric starch Redibond 2038 (Corn Products, 10 Finderne Avenue, Bridgewater, N.J. 08807) (for lint control) and 0.25 kg/ton of the glyoxylated polyacrylamide Hercobond 1194 (Ashland, 500 Hercules Road, Wilmington Del., 19808) (for strength when wet and for lint control). The remaining 20% of the first exterior layer was northern bleached softwood kraft fibers. The interior layer was composed of 40% northern bleached softwood kraft fibers, 60% eucalyptus fibers, and 1.0 kg/ton of T526, a softener/debonder (EKA Chemicals Inc., 1775 West Oak Commons Court, Marietta, Ga., 30062). The second exterior layer was composed of 20% northern bleached softwood kraft fibers, 80% eucalyptus fibers and 3.0 kg/ton of Redibond 2038 (to limit refining and impart Z-direction strength). The softwood fibers were refined at 115 kwh/ton to impart the necessary tensile strength.

The fiber and chemicals mixtures were diluted to solids of 0.5% consistency and fed to separate fan pumps, which delivered the slurry to a triple layered headbox. The headbox pH was controlled to 7.0 by addition of a caustic to the thick stock that was fed to the fan pumps. The headbox deposited the slurry to a nip formed by a forming roll, an outer forming wire, and inner forming wire. The slurry was drained through the outer wire, of a KT194-P design by Asten Johnson (4399 Corporate Rd, Charleston, S.C. USA), to aid with drainage, fiber support, and web formation. When the fabrics separated, the web followed the inner forming wire and dried to approximately 25% solids using a series of vacuum boxes and a steam box.

The web was then transferred to a structured fabric with the aid of a vacuum box to facilitate fiber penetration into the structured fabric to enhance bulk softness and web imprinting. The structured fabric used was a Prolux 005 design supplied by Albany (216 Airport Drive Rochester, N.H. USA), which has a 5 shed design with a warp pick sequence of 1, 3, 5, 2, 4, a 17.8 by 11.1 yarn/cm Mesh and Count, a 0.35 mm warp monofilament, a 0.50 mm weft monofilament, a 1.02 mm caliper, a permeability value of 640 cubic feet of air per minute (cfm), and a knuckle surface that was sanded to impart a 27% contact area with the Yankee dryer. The web was dried with the aid of two TAD hot air impingement drums to 85% moisture before being transferred to the Yankee dryer.

The web was held in intimate contact with the Yankee drum surface using an adhesive coating chemistry. The Yankee dryer was provided with steam at 3.0 bar while the installed hot air impingement hood over the Yankee dryer was blowing heated air at up to 450 degrees C. In accordance with an exemplary embodiment of the present invention, the web was creped from the yankee dryer at 10% crepe (speed differential between the yankee dryer and reel drum) using a blade with a wear resistant chromia titania material with a set up angle of 20 degrees, a 0.50 mm creping shelf distance, and an 80 degree blade bevel. In alternative embodiments, the web may be creped from the Yankee at 10% crepe using a ceramic blade at a pocket angle of 90 degrees. The caliper of the web was approximately 375 microns (single ply) before traveling through the calender to reduce the bulk to 275 microns (single ply). The web was cut into two of equal width using a high pressure water stream at 10,000 psi and was reeled into two equally sized parent rolls and transported to the converting process.

In the converting process, the two webs were plied together using mechanical ply bonding, or light embossing of the DEKO configuration (only the top sheet is embossed with glue applied to the inside of the top sheet at the high points derived from the embossments using and adhesive supplied by a cliché roll) with the second exterior layer of each web facing each other. The embossment coverage on the top sheet was 4%. The product was wound into a 190 sheet count roll at 121 mm.

An alternative process was also performed in which the web was not calendered on the paper machine before being converted as described above. In that case, the web was wound into a 176 count product at 121 mm and had approximately the same physical properties as described previously.

Comparative Example

2-Ply Laminate Tissue with HF >91.0 and Lint Value <6.1

Two webs of through air dried tissue were laminated to produce a roll of 2-ply sanitary (bath) tissue with 190 sheets each 4.0 inches long and 4.0 inches wide. The laminate was rolled on a roll that was 121 mm in diameter. The 2-ply tissue further had the following product attributes: a Basis Weight of 38.2 g/m$^2$, a Caliper of 0.525 mm, an MD tensile of 155 N/m, a CD tensile of 82 N/m, a ball burst of 222 grams force, a lint value of 6.04, an MD stretch of 11.9%, a CD stretch of 7.2%, a CD wet tensile of 8.7 N/m, a HF of 92.2 and a TS7 of 8.5.

Each tissue web was multilayered with the fiber and chemistry of each layer selected and prepared individually to maximize product quality attributes of softness and strength. The first exterior layer, which contacted the Yankee dryer, was prepared using 95% eucalyptus with 0.25 kg/ton of the amphoteric starch Redibond 2038 (Corn Products, 10 Finderne Avenue, Bridgewater, N.J. 08807) (for lint control) and 0.25 kg/ton of the glyoxylated polyacrylamide Hercobond 1194 (Ashland, 500 Hercules Road, Wilmington Del., 19808) (for strength when wet and for lint control). The remaining 5% of the first exterior layer was northern bleached softwood kraft fibers. The interior layer was composed of 40% northern bleached softwood kraft fibers, 60% eucalyptus fibers, and 1.5 kg/ton of T526, a softener/debonder from EKA Chemicals Inc., 1775 West Oak Commons Court, Marietta, Ga. USA. The second exterior layer was composed of 20% northern bleached softwood kraft fibers, 80% eucalyptus fibers and 3.0 kg/ton of Redibond 2038 (to limit refining and impart Z-direction strength). The softwood fibers were refined at 135 kwh/ton to impart the necessary tensile strength.

The fiber and chemicals mixtures were diluted to solids of 0.5% consistency and fed to separate fan pumps which delivered the slurry to a triple layered headbox. The headbox pH was controlled to 7.0 by the addition of a caustic to the thick stock that was fed to the fan pumps. The headbox deposited the slurry to a nip formed by a forming roll, an outer forming wire, and inner forming wire. The slurry was drained through the outer wire, which was a KT194-P design supplied by Asten Johnson (4399 Corporate Rd, Charleston, S.C. USA), to aid with drainage, fiber support, and web formation. When the fabrics were separated, the web followed the inner forming wire and was dried to approximately 25% solids using a series of vacuum boxes and a steam box.

The web was then transferred to a structured fabric which the aid of a vacuum box to facilitate fiber penetration into the structured fabric to enhance bulk softness and web imprinting. The structured fabric was a Prolux 005 design supplied by Albany (216 Airport Drive Rochester, N.H. USA) with a 5 shed design with a warp pick sequence of 1, 3, 5, 2, 4, a 17.8 by 11.1 yarn/cm Mesh and Count, a 0.35 mm warp monofilament, a 0.50 mm weft monofilament, a 1.02 mm caliper, with a 640 cfm and a knuckle surface that was sanded to impart 27% contact area with the Yankee dryer. The web was dried with the aid of two TAD hot air impingement drums to 85% moisture before being transferred to the Yankee dryer.

The web was held in intimate contact with the Yankee dryer surface using an adhesive coating chemistry. The Yankee dryer was provided with steam at 3.0 bar while the installed hot air impingement hood over the Yankee was blowing heated air up to 450 degrees C. In accordance with an exemplary embodiment of the present invention, the web was creped from the yankee at 10% crepe (speed differential between the yankee dryer and reel drum) using a blue steel material with a set up angle of 20 degrees, a 1.2 mm creping shelf distance, and an 80 degree blade bevel. In alternative embodiments, the web may be creped from the Yankee dryer at 10% crepe using a ceramic blade at a pocket angle of 90 degrees. The caliper of the web was approximately 375 microns (single ply) before traveling through the calender to reduce the bulk to 275 microns (single ply). The web was cut into two webs of equal width using a high pressure water stream at 10,000 psi and reeled into two equally sized parent rolls and transported to the converting process.

In the converting process, the two webs were plied together using mechanical ply bonding, or light embossing of the DEKO configuration (only the top sheet was embossed with glue applied to the inside of the top sheet at the high points derived from the embossments using and adhesive supplied by a cliché roll) with the second exterior layer of each web facing each other. The embossment coverage on the top sheet was 4%. The product was wound into a 190 sheet count product at 121 mm.

An alternative process was also performed in which the web was not calendered on the paper machine before being converted as described above. In that case, the web was wound into a 176 count product at 121 mm and had approximately the same physical properties as described previously.

Comparative Test Results from Commercially Available Products

Table 1 shows comparative test results for similar testing performed on various commercially available products. The test results are shown for basis weight, bulk, Dry MD and CD strength and stretch, Wet CD strength, Performance, Geometric Mean Tensile (GMT) strength, ball burst, HF and lint value.

The tests confirm that the present invention is advantageous as all of the other tested products do not demonstrate the same levels of high softness and low lint. For example, all of the commercially available products demonstrated lower softness (i.e., lower HF values) compared to the Example, and in some cases, higher lint values compared to the Example combined with the lower softness.

TABLE 1

Competitor Quality Attributes (6 samples tested and averaged for each month when tested)

| Brand/location | Date Month-Year | Paper Type | g/m^2 Basis Wt | microns Bulk | N/m MD Strength | % MD Stretch | N/m CD Strength | $ CD Stretch | N/m CD Wet |
|---|---|---|---|---|---|---|---|---|---|
| Charmin Strong/Walmart | Jan-15 | TAD-2ply | 35.73 | 516.78 | 168.34 | 18.22 | 74.56 | 14.07 | 14.17 |
| Charmin Strong/Walmart | Feb-15 | TAD-2ply | 37.03 | 555.25 | 190.57 | 16.70 | 85.13 | 11.99 | 12.79 |
| Charmin Strong/Walmart | Mar-15 | TAD-2ply | 37.34 | 487.12 | 183.47 | 16.99 | 85.60 | 13.86 | 18.62 |
| Charmin Strong/Walmart | Apr-15 | TAD-2ply | 37.49 | 578.33 | 210.23 | 18.70 | 100.51 | 9.77 | 15.89 |
| Charmin Strong/Walmart | May-15 | TAD-2ply | 37.38 | 570.92 | 169.43 | 16.30 | 83.60 | 12.00 | 17.45 |
| Charmin Strong/Walmart | Jun-15 | TAD-2ply | 43.14 | 537.50 | 235.06 | 18.23 | 131.21 | 9.65 | 20.77 |
| Charmin Strong/Sam's Club | Jan-15 | TAD-2ply | 36.58 | 553.53 | 178.49 | 17.56 | 70.23 | 13.02 | 15.02 |
| Charmin Strong/Sam's Club | Feb-15 | TAD-2ply | 36.42 | 406.33 | 228.86 | 19.25 | 101.71 | 10.80 | 22.79 |
| Charmin Strong/Sam's Club | Mar-15 | TAD-2ply | 37.00 | 469.13 | 161.23 | 17.09 | 81.78 | 12.30 | 17.17 |
| Charmin Strong/Sam's Club | Apr-15 | TAD-2ply | 37.69 | 458.62 | 174.62 | 17.11 | 87.32 | 8.83 | 17.47 |
| Charmin Strong/Sam's Club | May-15 | TAD-2ply | 37.75 | 461.93 | 183.25 | 17.16 | 96.38 | 11.20 | 19.09 |
| Charmin Strong/Sam's Club | Jun-15 | TAD-2ply | 37.58 | 450.10 | 180.81 | 16.27 | 89.64 | 11.68 | 17.53 |
| Charmin Soft-/Walmart | Jan-15 | TAD-2ply | 45.60 | 602.92 | 111.10 | 22.98 | 55.45 | 9.21 | 15.92 |
| Charmin Soft-/Walmart | Feb-15 | TAD-2ply | 45.37 | 648.58 | 133.00 | 25.77 | 59.48 | 10.45 | 12.90 |
| Charmin Soft-/Walmart | Mar-15 | TAD-2ply | 45.29 | 491.48 | 107.69 | 22.34 | 56.80 | 12.11 | 11.90 |
| Charmin Soft-/Walmart | Apr-15 | TAD-2ply | 47.35 | 658.47 | 127.66 | 26.10 | 58.57 | 9.50 | 13.18 |
| Charmin Soft-/Walmart | May-15 | TAD-2ply | 46.96 | 610.87 | 147.44 | 23.45 | 64.40 | 9.87 | 17.39 |
| Charmin Soft-/Walmart | Jun-15 | TAD-2ply | 47.23 | 594.97 | 134.01 | 22.78 | 61.16 | 12.96 | 14.85 |
| Charmin Soft/Sam's Club | Jan-15 | TAD-2ply | 47.06 | 576.18 | 122.53 | 23.55 | 56.12 | 11.02 | 14.21 |
| Charmin Soft/Sam's Club | Feb-15 | TAD-2ply | 47.91 | 554.00 | 108.79 | 23.61 | 55.29 | 10.14 | 14.93 |
| Charmin Soft/Sam's Club | Mar-15 | TAD-2ply | 47.27 | 566.18 | 105.13 | 22.59 | 50.24 | 10.17 | 14.51 |
| Charmin Soft/Sam's Club | Apr-15 | TAD-2ply | 47.87 | 578.66 | 113.97 | 20.50 | 53.36 | 9.36 | 15.06 |
| Charmin Soft/Sam's Club | May-15 | TAD-2ply | 47.14 | 539.53 | 145.64 | 26.07 | 63.59 | 9.04 | 16.55 |
| Charmin Soft/Sam's Club | Jun-15 | TAD-2ply | 48.03 | 537.13 | 141.38 | 23.33 | 62.02 | 11.04 | 14.36 |
| White Cloud 2ply/Walmart | May-15 | TAD-2ply | 42.47 | 444.13 | 194.54 | 16.80 | 117.25 | 6.18 | 19.79 |
| White Cloud 2ply/Walmart | Jun-15 | TAD-2ply | 39.31 | 506.22 | 185.72 | 20.58 | 105.59 | 6.76 | 11.00 |
| Kirkland Signature/Costco | Jan-15 | Conventional 2-ply | 37.16 | 293.37 | 168.80 | 25.33 | 55.45 | 8.85 | 10.68 |
| Kirkland Signature/Costco | Feb-15 | Conventional 2-ply | 37.75 | 310.67 | 117.91 | 24.90 | 47.71 | 7.20 | 7.03 |
| Kirkland Signature/Costco | Mar-15 | Conventional 2-ply | 35.75 | 405.05 | 140.05 | 22.13 | 47.97 | 7.44 | 8.12 |
| Kirkland Signature/Costco | Apr-15 | Conventional 2-ply | 35.67 | 309.47 | 135.52 | 24.77 | 45.52 | 6.72 | 7.98 |
| Kirkland Signature/Costco | May-15 | Conventional 2-ply | 36.94 | 366.40 | 138.24 | 23.62 | 46.60 | 5.05 | 9.33 |
| Kirkland Signature/Costco | Jun-15 | Conventional 2-ply | 37.20 | 319.10 | 129.33 | 24.53 | 49.41 | 7.14 | 7.77 |
| Great Value Ultra Soft/Walmart | Mar-15 | TAD-2 ply | 47.63 | 554.63 | 131.06 | 13.61 | 100.55 | 613 | 10.90 |
| Great Value Ultra Soft/Walmart | Apr-15 | TAD-2-ply | 48.12 | 505.03 | 167.81 | 13.78 | 80.72 | 5.33 | 12.16 |
| Great Value Ultra Soft/Walmart | Jun-15 | TAD-2ply | 47.91 | 500.25 | 189.98 | 21.08 | 120.51 | 5.92 | 13.05 |
| Up&Up/Target | Jan-15 | TAD-2 ply | 39.92 | 530.77 | 152.61 | 14.36 | 53.16 | 7.29 | 12.15 |
| Up&Up/Target | Feb-15 | TAD-2ply | 43.28 | 544.13 | 157.74 | 11.49 | 68.48 | 5.99 | 12.14 |
| Up&Up/Target | Mar-15 | TAD-2ply | 39.16 | 544.48 | 147.43 | 13.07 | 70.35 | 6.83 | 9.96 |
| Up&Up/Target | Apr-15 | TAD-2ply | 38.97 | 525.13 | 195.83 | 13.63 | 82.88 | 6.62 | 10.64 |
| Up&Up/Target | May-15 | TAD-2ply | 38.44 | 527.37 | 172.95 | 13.38 | 88.27 | 6.37 | 11.30 |
| Up&Up/Target | Jun-15 | TAD-2ply | 42.88 | 544.97 | 161.72 | 11.27 | 69.03 | 6.52 | 12.44 |
| Charmin Sensitive/Walmart | Jan-15 | TAD-2ply | 4217 | 540.13 | 124.91 | 18.40 | 75.62 | 8.78 | 9.68 |
| Charmin Sensitive/Walmart | Mar-15 | TAD-2 ply | 42.45 | 643.00 | 116.52 | 21.88 | 76.18 | 11.19 | 12.69 |
| Home Ultra Soft/Safeway | Jan-15 | TAD 2ply | 48.66 | 540.03 | 202.50 | 18.40 | 105.20 | 6.36 | 10.91 |
| Home Ultra Soft/Safeway | Feb-15 | TAD 2ply | 50.24 | 555.82 | 168.09 | 22.63 | 110.62 | 6.54 | 14.47 |
| Home Ultra Soft/Safeway | Apr-15 | TAD 2ply | 49.29 | 547.42 | 191.75 | 22.68 | 123.89 | 5.20 | 14.46 |
| Home Uftra Soft/Safeway | Jun-15 | TAD 2ply | 48.70 | 525.23 | 194.68 | 19.35 | 104.07 | 7.20 | 10.20 |
| Scott Extra Soft/Walmart | Jun-15 | UCTAD 1 ply | 28.24 | 502.57 | 122.05 | 9.70 | 51.79 | 11.55 | 6.96 |
| Scott-1000/Walmart | Jun-15 | Conventional 1ply | 16.86 | 143.42 | 155.01 | 16.40 | 63.79 | 6.88 | 2.36 |
| Cottonelle/Walmart | Jan-15 | UCTAD 1ply | 39.30 | 714.42 | 107.06 | 15.31 | 63.11 | 10.35 | 13.23 |
| Cottonelle/Walmart | Feb-15 | UCTAD 1ply | 40.92 | 627.43 | 130.55 | 18.54 | 55.79 | 9.65 | 11.44 |
| Cottonelle/Walmart | Mar-15 | UCTAD 1ply | 38.10 | 634.77 | 155.52 | 16.87 | 74.20 | 31.17 | 11.42 |
| Cottonelle/Walmart | Apr-15 | UCTAD 1ply | 40.35 | 651.78 | 134.39 | 15.44 | 70.47 | 9.42 | 13.40 |
| Angel Soft/Walmart | Jan-15 | Conventional 2ply | 37.28 | 413.88 | 181.34 | 25.57 | 65.07 | 9.50 | 10.52 |
| Angel Soft/Walmart | Feb-15 | Conventional 2ply | 36.97 | 540.30 | 163.81 | 19.11 | 54.96 | 8.66 | 7.98 |
| Angel Soft/Walmart | Mar-15 | Conventional 2ply | 36.46 | 494.80 | 124.45 | 19.74 | 49.64 | 9.58 | 4.68 |
| Angel Soft/Walmart | Apr-15 | Conventional 2ply | 37.50 | 435.60 | 169.47 | 19.72 | 59.39 | 7.62 | 7.05 |
| Cottonelle Ultra/Walmart | Feb-15 | UCTAD 2ply | 44.44 | 747.23 | 184.03 | 10.66 | 78.93 | 11.41 | 12.27 |
| Cottonelle Ultra/Walmart | Apr-15 | UCTAD 2 ply | 44.62 | 733.88 | 169.15 | 11.14 | 73.78 | 9.84 | 12.63 |
| Cottonelle Ultra/Walmart | Jun-15 | UCTAD 2 ply | 42.16 | 536.37 | 150.98 | 10.85 | 64.49 | 10.66 | 9.20 |

| Brand/location | Date Month-Year | N/m Perf. | N/m GMT | gf Ball Burst | HF Softness | Lint Value |
|---|---|---|---|---|---|---|
| Charmin Strong/Walmart | Jan-15 | 55.03 | 111.97 | 287.12 | 87.57 | 3.50 |
| Charmin Strong/Walmart | Feb-15 | 73.04 | 127.34 | 332.45 | 87.47 | 4.87 |
| Charmin Strong/Walmart | Mar-15 | 67.80 | 125.30 | 322.85 | 89.45 | 6.77 |
| Charmin Strong/Walmart | Apr-15 | 64.01 | 145.23 | 334.47 | 86.55 | 5.20 |
| Charmin Strong/Walmart | May-15 | 62.86 | 118.90 | 343.40 | 88.02 | 3.79 |
| Charmin Strong/Walmart | Jun-15 | 81.27 | 175.51 | 358.40 | 87.98 | 5.75 |
| Charmin Strong/Sam's Club | Jan-15 | 73.17 | 111.76 | 296.56 | 91.53 | 7.31 |
| Charmin Strong/Sam's Club | Feb-15 | 71.83 | 152.27 | 353.18 | 89.57 | 3.79 |
| Charmin Strong/Sam's Club | Mar-15 | 58.00 | 114.73 | 289.48 | 91.03 | Not Tested |

TABLE 1-continued

| Competitor Quality Attributes (6 samples tested and averaged for each month when tested) | | | | | | |
|---|---|---|---|---|---|---|
| Charmin Strong/Sam's Club | Apr-15 | 57.73 | 123.38 | 334.14 | 89.80 | 6.32 |
| Charmin Strong/Sam's Club | May-15 | 65.53 | 132.88 | 369.52 | 87.32 | 3.33 |
| Charmin Strong/Sam's Club | Jun-15 | 73.84 | 127.12 | 357.73 | 90.95 | 5.51 |
| Charmin Soft-/Walmart | Jan-15 | 53.27 | 78.41 | 196.47 | 97.63 | 13.08 |
| Charmin Soft-/Walmart | Feb-15 | 61.92 | 88.88 | 207.76 | 95.80 | 7.26 |
| Charmin Soft-/Walmart | Mar-15 | 69.91 | 78.17 | 211.64 | 96.80 | 8.64 |
| Charmin Soft-/Walmart | Apr-15 | 78.13 | 86.42 | 246.18 | 97.63 | 8.87 |
| Charmin Soft-/Walmart | May-15 | 74.92 | 97.08 | 245.50 | 97.05 | 10.35 |
| Charmin Soft-/Walmart | Jun-15 | 68.11 | 90.49 | 265.72 | 97.57 | 8.28 |
| Charmin Soft/Sam's Club | Jan-15 | 54.09 | 82.74 | 224.11 | 95.12 | 6.81 |
| Charmin Soft/Sam's Club | Feb-15 | 47.13 | 77.48 | 211.80 | 98.70 | 9.39 |
| Charmin Soft/Sam's Club | Mar-15 | 48.82 | 72.54 | 189.56 | 97.05 | 9.65 |
| Charmin Soft/Sam's Club | Apr-15 | 61.61 | 77.84 | 225.96 | 97.57 | 8.31 |
| Charmin Soft/Sam's Club | May-15 | 70.95 | 96.23 | 237.42 | 95.22 | 7.60 |
| Charmin Soft/Sam's Club | Jun-15 | 147.66 | 93.62 | 242.64 | 97.13 | 8.29 |
| White Cloud 2ply/Walmart | May-15 | 83.80 | 150.84 | 253.76 | 87.63 | 5.42 |
| White Cloud 2ply/Walmart | Jun-15 | 77.60 | 140.01 | 238.76 | 88.15 | 6.34 |
| Kirkland Signature/Costco | Jan-15 | 56.66 | 96.68 | 209.78 | 86.12 | 5.43 |
| Kirkland Signature/Costco | Feb-15 | 46.10 | 74.88 | 117.28 | 84.95 | 1.46 |
| Kirkland Signature/Costco | Mar-15 | 47.19 | 81.85 | 138.34 | 82.62 | 2.43 |
| Kirkland Signature/Costco | Apr-15 | 49.97 | 78.39 | 131.60 | 88.63 | 5.48 |
| Kirkland Signature/Costco | May-15 | 57.62 | 80.18 | 105.48 | 87.78 | 2.23 |
| Kirkland Signature/Costco | Jun-15 | 56.62 | 79.82 | 132.44 | 87.28 | 3.85 |
| Great Value Ultra Soft/Walmart | Mar-15 | 48.41 | 114.69 | 204.05 | 85.68 | 6.20 |
| Great Value Ultra Soft/Walmart | Apr-15 | 62.45 | 116.20 | 206.80 | 88.17 | 9.09 |
| Great Value Ultra Soft/Walmart | Jun-15 | 64.24 | 151.29 | 234.05 | 72.18 | 7.38 |
| Up&Up/Target | Jan-15 | 62.72 | 89.87 | 178.78 | 88.38 | 6.76 |
| Up&Up/Target | Feb-15 | 63.60 | 103.88 | 207.59 | 90.38 | 8.64 |
| Up&Up/Target | Mar-15 | 68.50 | 101.52 | 214.84 | 90.48 | 6.20 |
| Up&Up/Target | Apr-15 | 81.33 | 127.31 | 250.73 | 86.12 | 5.62 |
| Up&Up/Target | May-15 | 89.42 | 123.48 | 237.08 | 84.90 | 5.60 |
| Up&Up/Target | Jun-15 | 66.81 | 105.64 | 194.62 | 90.47 | 9.27 |
| Charmin Sensitive/Walmart | Jan-15 | 56.25 | 97.10 | 265.05 | 87.57 | 4.11 |
| Charmin Sensitive/Walmart | Mar-15 | 57.04 | 94.12 | 215.51 | 86.77 | 2.74 |
| Home Ultra Soft/Safeway | Jan-15 | 55.78 | 145.77 | 182.15 | 86.88 | 7.77 |
| Home Ultra Soft/Safeway | Feb-15 | 76.81 | 136.16 | 248.71 | 87.40 | 4.86 |
| Home Ultra Soft/Safeway | Apr-15 | 61.15 | 154.13 | 233.20 | 86.25 | 5.21 |
| Home Uftra Soft/Safeway | Jun-15 | 85.06 | 142.34 | 241.80 | 85.80 | 6.96 |
| Scott Extra Soft/Walmart | Jun-15 | 76.41 | 79.44 | 199.84 | 81.70 | 2.96 |
| Scott-1000/Walmart | Jun-15 | 88.16 | 99.20 | 132.95 | 67.02 | 0.33 |
| Cottonelle/Walmart | Jan-15 | 67.05 | 82.10 | 163.95 | 84.18 | 5.80 |
| Cottonelle/Walmart | Feb-15 | 72.80 | 85.21 | 118.62 | 87.17 | 7.89 |
| Cottonelle/Walmart | Mar-15 | 88.03 | 107.20 | 213.83 | 83.60 | 5.21 |
| Cottonelle/Walmart | Apr-15 | 82.72 | 97.19 | 193.78 | 82.48 | 6.36 |
| Angel Soft/Walmart | Jan-15 | 62.63 | 108.53 | 234.55 | 78.73 | 2.05 |
| Angel Soft/Walmart | Feb-15 | 63.92 | 94.74 | 209.78 | 76.65 | 2.86 |
| Angel Soft/Walmart | Mar-15 | 60.13 | 78.34 | 203.55 | 79.82 | 2.14 |
| Angel Soft/Walmart | Apr-15 | 62.88 | 100.19 | 220.57 | 83.08 | 4.34 |
| Cottonelle Ultra/Walmart | Feb-15 | 111.24 | 120.47 | 338.18 | 84.95 | 6.96 |
| Cottonelle Ultra/Walmart | Apr-15 | 110.42 | 111.34 | 287.80 | 84.07 | 5.36 |
| Cottonelle Ultra/Walmart | Jun-15 | 98.03 | 98.61 | 252.92 | 86.17 | 6.29 |

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A method for forming tissue product comprising:

forming a structured tissue web on a papermaking machine;

transferring the structured tissue web to a drying drum with a hot air impingement hood blowing heated air onto the drying drum;

creping the structured tissue web off the drum with a creping blade to form tissue paper; and laminating at least two plies of the tissue paper to form the tissue product, wherein the tissue product has a lint value of less than 5.5 and a bulk softness TS7 of 10 or less, and the tissue product is substantially free of any surface deposited softener agents or lotions.

2. The method of claim 1, wherein the air is heated up to 450° C.

3. The method of claim 1, further comprising the step of taking the tissue paper up on a reel drum, wherein a speed differential between the drying drum and the reel drum is 10 percent.

4. The method of claim 1, wherein the tissue product has a softness value of 91.0 HF or greater.

5. The method of claim 1, wherein the tissue paper comprises first and second exterior layers and an interior layer, and the exterior layers are substantially free of any surface deposited softener agents or lotions.

6. The method of claim 5, wherein the first exterior layer comprises a wet end temporary wet strength additive in an amount of 0.25 kg/ton to 5 kg/ton and a wet end dry strength additive in an amount of 1 kg/ton to 40 kg/ton, and the interior layer comprises a first wet end additive comprising an ionic surfactant, and a second wet end additive comprising a non-ionic surfactant.

7. The method of claim 6, wherein the first exterior layer further comprises at least 75% by weight hardwood fibers.

8. The method of claim 7, wherein the first exterior layer further comprises at least 20% by weight of softwood fibers.

9. The method of claim 7, where the interior layer further comprises at least 40% by weight softwood fibers.

10. The method of claim 6, wherein the second wet end additive comprises one or more ethoxylated vegetable oils.

11. The method of claim 6, wherein the ratio by weight of the second wet end additive to the first wet end additive in the interior layer of the tissue paper is at least eight to one.

12. The method of claim 6, wherein the ratio by weight of the second wet end additive to the first wet end additive in the interior layer is at most ninety to one.

13. The method of claim 6, wherein the ionic surfactant comprises a debonder.

14. The method of claim 6, wherein the wet end temporary wet strength additive comprises glyoxalated polyacrylamide.

15. The method of claim 14, wherein the wet end dry strength additive comprises amphoteric starch.

16. The method of claim 6, wherein the second exterior layer comprises a wet end dry strength additive.

17. The method of claim 16, wherein the wet end dry strength additive comprises amphoteric starch.

18. The method of claim 6, wherein the interior layer is comprised of at least 75% by weight of softwood fibers.

19. The method of claim 6, wherein the second exterior layer further comprises a wet end dry strength additive.

20. The method of claim 6, wherein the second exterior layer further comprises a temporary wet strength additive.

21. The method of claim 6, wherein the second exterior layer further comprises a dry strength additive.

22. The method of claim 6, wherein the first exterior layer further comprises a dry strength additive.

23. The method of claim 6, wherein the tissue product has an MD tensile strength and a CD tensile strength of at least 35 N/m and has a basis weight of less than 40 gsm.

24. The method of claim 6, wherein the tissue product has an MD tensile strength and a CD tensile strength of at least 35 N/m and a caliper of less than 650 microns.

25. The method of claim 6, wherein the non-ionic surfactant has a hydrophilic-lipophilic balance of less than 10.

26. The method of claim 6, wherein each of the at least two plies comprise an embossed area, wherein the embossed area occupies between 3 to 15% of the total surface area of a surface of the ply.

27. The method of claim 1, wherein the tissue product is one of a sanitary, bath or facial tissue product.

28. The method of claim 1, wherein the tissue product has a caliper of at least 500 microns.

29. The method of claim 1, wherein the tissue product has a caliper of 500 microns to 650 microns.

* * * * *